United States Patent
Asai et al.

(10) Patent No.: US 8,918,589 B2
(45) Date of Patent: Dec. 23, 2014

(54) MEMORY CONTROLLER, MEMORY SYSTEM, SEMICONDUCTOR INTEGRATED CIRCUIT, AND MEMORY CONTROL METHOD

(75) Inventors: Koji Asai, Hyogo (JP); Tetsuji Mochida, Osaka (JP); Daisuke Imoto, Osaka (JP); Takashi Yamada, Hyogo (JP); Wataru Ohkoshi, Kyoto (JP)

(73) Assignee: Panasonic Corporation, Osaka (JP)

( * ) Notice: Subject to any disclaimer, the term of this patent is extended or adjusted under 35 U.S.C. 154(b) by 655 days.

(21) Appl. No.: 12/988,396

(22) PCT Filed: Apr. 21, 2009

(86) PCT No.: PCT/JP2009/001815
§ 371 (c)(1),
(2), (4) Date: Oct. 18, 2010

(87) PCT Pub. No.: WO2009/130888
PCT Pub. Date: Oct. 29, 2009

(65) Prior Publication Data
US 2011/0035559 A1    Feb. 10, 2011

(30) Foreign Application Priority Data
Apr. 22, 2008 (JP) ................. 2008-111185

(51) Int. Cl.
*G06F 12/02* (2006.01)
*G06F 13/16* (2006.01)
*G06F 12/08* (2006.01)
*G06F 9/45* (2006.01)

(52) U.S. Cl.
CPC ........ *G06F 13/1642* (2013.01); *G06F 12/0862* (2013.01); *G06F 8/4442* (2013.01); *G06F 2212/6022* (2013.01)
USPC ................. 711/137; 711/5; 710/14

(58) Field of Classification Search
USPC ................ 711/5; 345/545, 564–572; 710/35, 710/52–56
See application file for complete search history.

(56) References Cited

U.S. PATENT DOCUMENTS 6,005,592 A    12/1999  Koizumi et al.
6,418,077 B1    7/2002  Naven
(Continued)

FOREIGN PATENT DOCUMENTS

JP    9-190376    7/1997
JP    10-105367   4/1998
(Continued)

OTHER PUBLICATIONS

International Search Report issued Aug. 11, 2009 in International (PCT) Application No. PCT/JP2009/001815.

*Primary Examiner* — April Y Blair
*Assistant Examiner* — Nicholas Simonetti
(74) *Attorney, Agent, or Firm* — Wenderoth, Lind & Ponack, L.L.P.

(57) ABSTRACT

A memory controller (101) according to this invention includes: a command generation unit (102) which generates access commands each including a physical address, based on an access request including a logical address indicating a rectangular area in image data; and a command issuance unit (105) which issues, to a memory (0), the access commands generated by the command generation unit (102). The command generation unit (102) includes a group determination unit (104) which determines a group to which a bank including data to be accessed belongs, based on the physical address corresponding to the access request. The command generation unit (102) generates a pair of a first and a second access commands which share a prefetch buffer between two banks belonging to different groups, when data to be accessed is continuous across two banks belonging to different groups.

11 Claims, 21 Drawing Sheets

(56) References Cited

U.S. PATENT DOCUMENTS

| | | | |
|---|---|---|---|
| 6,556,506 B2 | 4/2003 | Naven | |
| 6,728,827 B2 | 4/2004 | Yamauchi et al. | |
| 7,562,184 B2 | 7/2009 | Henmi et al. | |
| 7,613,883 B2 * | 11/2009 | Bellows et al. | 711/137 |
| 2002/0109791 A1 * | 8/2002 | Champion | 348/714 |
| 2005/0152211 A1 * | 7/2005 | Henmi et al. | 365/233 |
| 2007/0014168 A1 * | 1/2007 | Rajan | 365/201 |

FOREIGN PATENT DOCUMENTS

| | | |
|---|---|---|
| JP | 10-144073 | 5/1998 |
| JP | 11-272550 | 10/1999 |
| JP | 2000-066950 | 3/2000 |
| JP | 2000-232623 | 8/2000 |
| JP | 2000-330864 | 11/2000 |
| JP | 2002-175689 | 6/2002 |
| JP | 2005-196485 | 7/2005 |
| JP | 2008-146330 | 6/2008 |

* cited by examiner

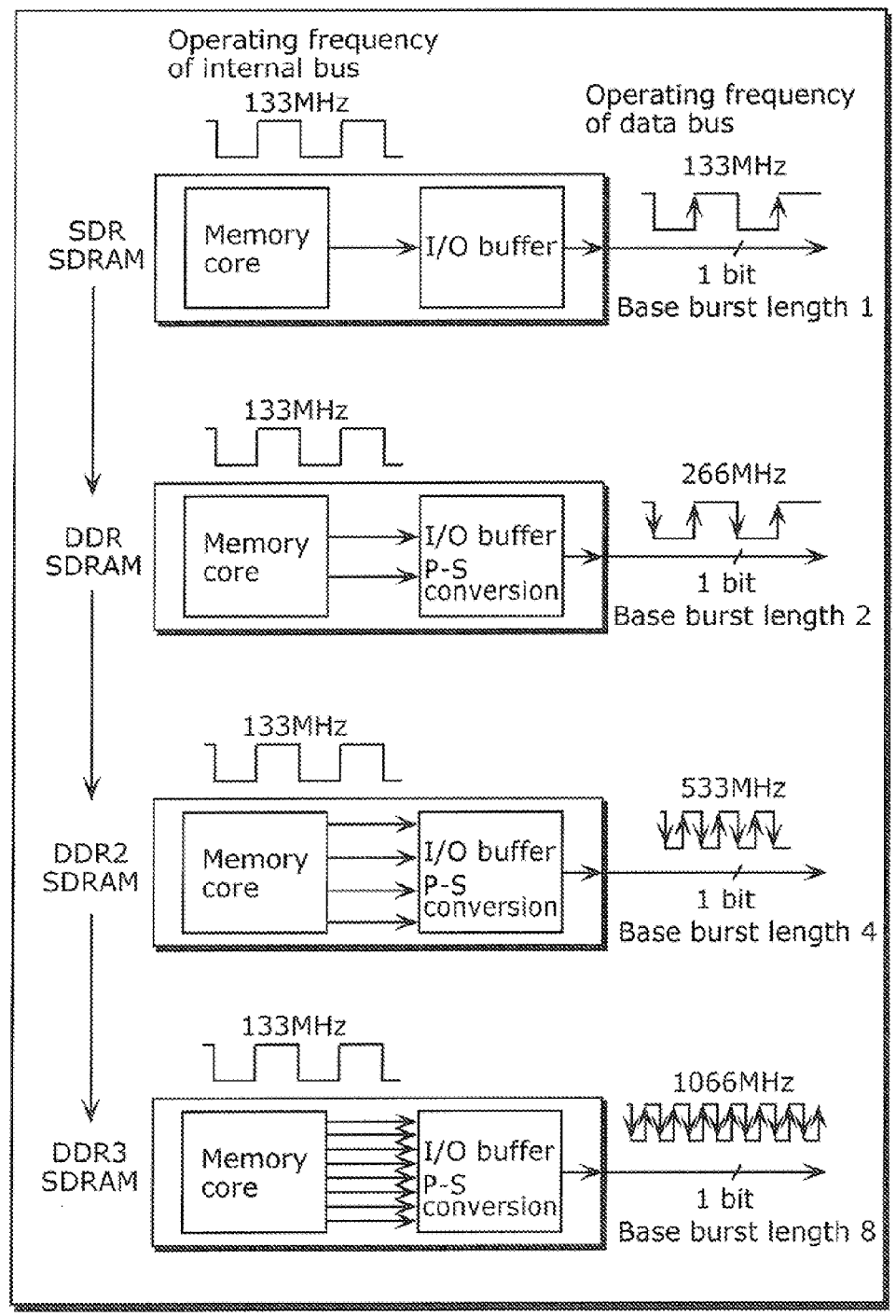

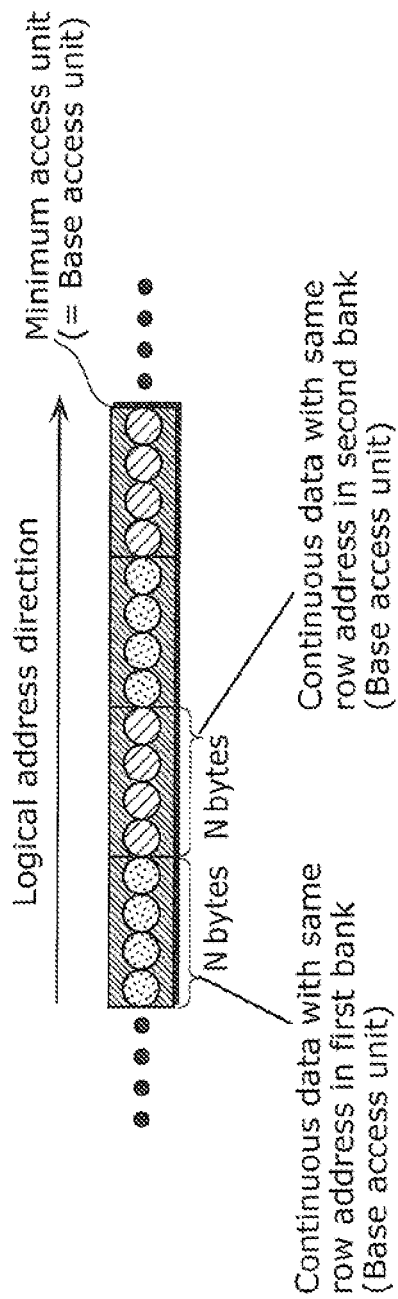

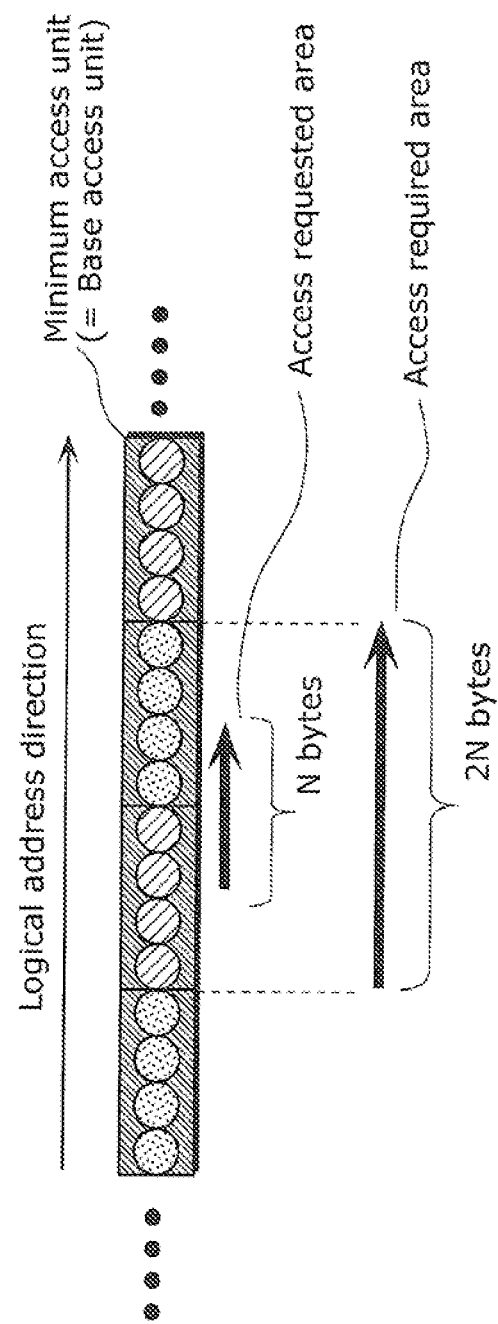

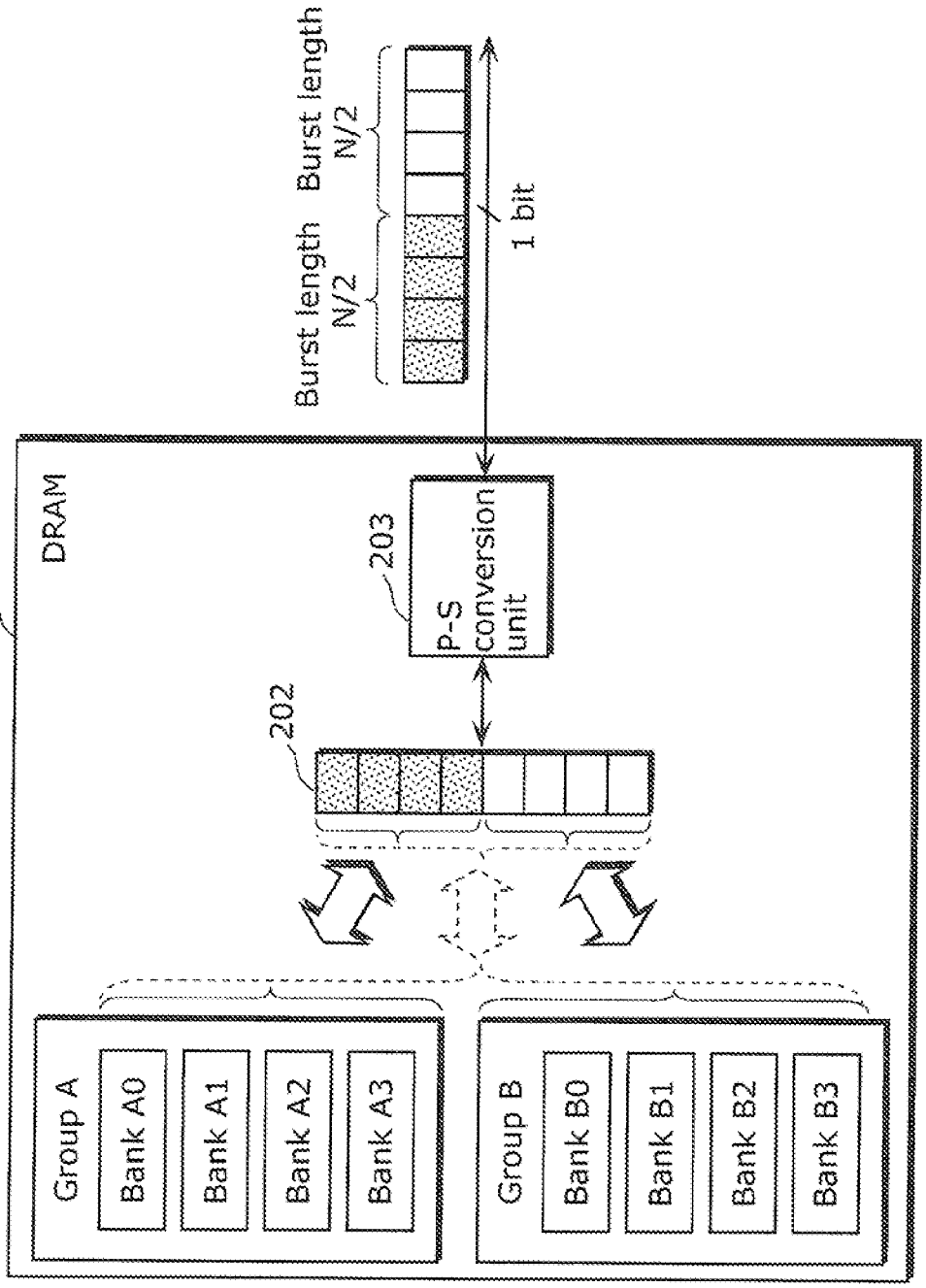

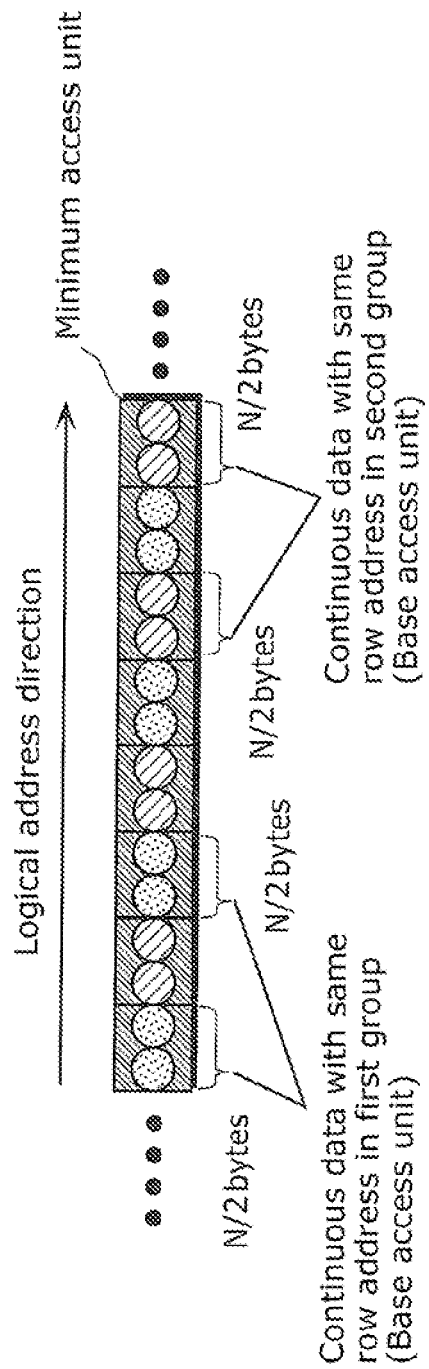

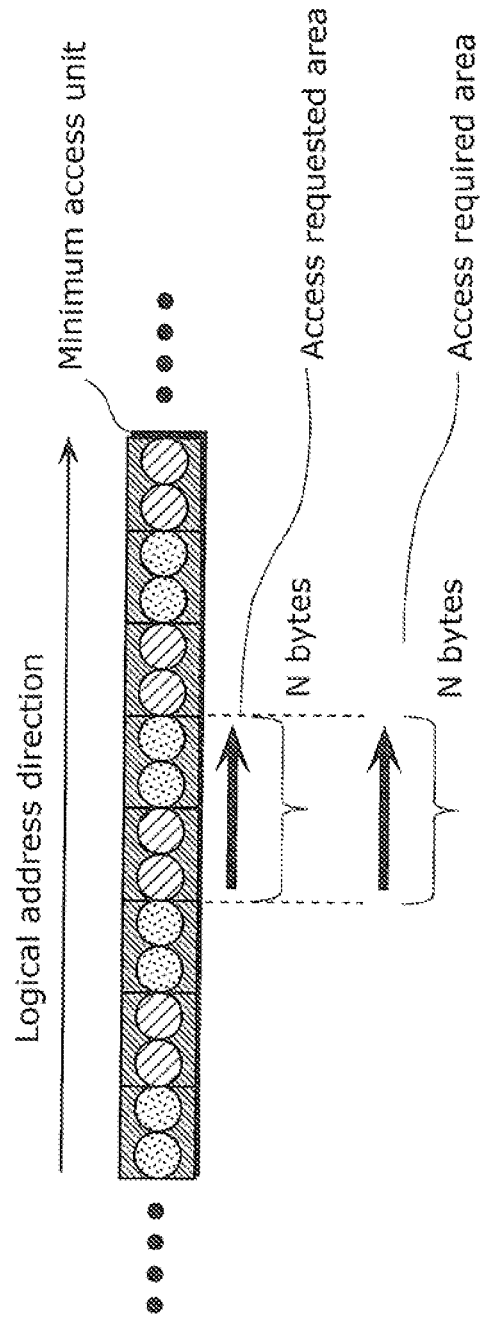

FIG. 11

|  | Group A | Group B |  |  |
|---|---|---|---|---|
|  |  |  |  |  |
|  |  |  |  |  |
|  |  | Necessary data |  |  |
|  |  |  |  |  |
| Data block 0 | Data block 8 | Data block 4 | Data block 12 |
| Data block 1 | Data block 9 | Data block 5 | Data block 13 |
| Data block 2 | Data block 10 | Data block 6 | Data block 14 |
| Data block 3 | Data block 11 | Data block 7 | Data block 15 |
|  |  |  |  |  |
| Actual transfer data |  |  |  |  |
|  |  |  |  |  |
|  |  |  |  |  |

FIG. 12

| Group A | Group B | | |
|---|---|---|---|
| | | | |
| | | | |
| | | Necessary data | |
| | | | |
| Data block 0 | Data block 8 | Data block 4 | Data block 12 |
| Data block 1 | Data block 9 | Data block 5 | Data block 13 |
| Data block 2 | Data block 10 | Data block 6 | Data block 14 |
| Data block 3 | Data block 11 | Data block 7 | Data block 15 |
| Actual transfer data | | | |
| | | | |
| | | | |

MEMORY CONTROLLER, MEMORY SYSTEM, SEMICONDUCTOR INTEGRATED CIRCUIT, AND MEMORY CONTROL METHOD

TECHNICAL FIELD

The present invention relates to a memory controller, a memory system, a semiconductor integrated circuit, and a memory control method which efficiently transfer data in an image processing system.

BACKGROUND ART

Information processing devices including image processors for consumer use generally use large-capacity and low-cost DRAMs to store a large amount of data. In particular, recent image processors require DRAMs with not just memory capacity but with high data transferring capability for High Definition (HD) image processing in MPEG 2, H.264, or the like, simultaneous multiple channel processing, and high-quality 3-D graphics processing. In order to achieve the high data transferring capability, some conventional methods are known including: (1) increasing the operating frequency of bus; (2) allowing a wide bus width in a memory; and a method with the combination of (1) and (2).

When accessing a DRAM, it is necessary to activate a bank and a row to be accessed for designating the bank and the row in advance. In addition, when changing a row to be accessed in the same bank, it is necessary to precharge the accessed row first, and activate the row to be newly accessed. During the activation process and the precharge process, the bank cannot be accessed, which generates an inaccessible period when switching the row in the same bank and generates idle cycle in data bus. In order to compensate for the disadvantage, in a regular DRAM access control, a control referred to as bank interleaving is performed. The bank interleaving masks the inaccessible period by activating and precharging another bank while transferring data to a certain bank, thereby allowing constant data transfer with the DRAM on the data bus. For effective bank interleaving, it is required to have longer continuous data transfer time to a same bank so as to mask the inaccessible period of a bank by transferring data to another bank.

Patent Literature 1 discloses a conventional method to solve the problem of the inefficient transfer due to the inaccessible period. In this method, time-division accesses are carried out alternately to memories A and B at a predetermined timing based on signals from counters 0 and 1 so that the inaccessible period generated in one of the memories is masked by the data transfer time of the other memory. In such a manner, bus access efficiency is improved. However, with the conventional technique, although multiple memories are used, only one memory is accessible at one time; and thus, the maximum memory bandwidth that can be used in a system is limited to the memory bandwidth of one memory.

FIG. 1A is a diagram showing various types of DRAMs, operating frequencies, and burst length according to the conventional technique. FIG. 1A shows four types of DRAMs: Single Data Rate (SDR) Synchronous DRAM (SDRAM); Double Data Rate (DDR) SDRAM; DDR2 SDRAM; and DDR3 SDRAM (hereinafter, referred to as SDR, DDR, DDR2, and DDR3). FIG. 1A shows the operating frequency of the internal bus and the operating frequency of the data bus for each of the four types of DRAMs. The data bus includes a bus width of multiple bits such as 32 bits or 64 bits; however, for ease of description, FIG. 1A shows only a portion corresponding to 1 bit.

The SDR includes a memory core and an I/O buffer. The memory core corresponds to one memory cell array, and inputs and outputs, to and from the data bus via the I/O buffer, 1-bit data of the memory cell array designated by a row address and a column address. The operating frequency of the internal bus of the SDR (133 MHz) is the same as the operating frequency of the external data bus (133 MHz).

The respective memory cores of the DDR, DDR2, and DDR3 are almost same as the memory core of the SDR.

The upper limit of the operating frequency of the internal bus is determined by the upper limit of the operating frequency of the memory core. More specifically, it is considered that the upper limit of the frequency to which capacitors used as memory cells can respond is approximately 200 MHz, and thus, the operating frequency of the memory core cannot exceed approximately 200 MHz, either. On the other hand, a master which accesses memories is becoming faster and faster every year. In the DDR, DDR2 and DDR3, for speeding up the DRAM, a method is used where multiple bit data are input and output in parallel between the I/O buffer and the memory core, and the data are serially input and output between the I/O buffer and the data bus.

The I/O buffer of the DDR inputs and outputs 2-bit data in parallel to and from the memory core at the operating frequency of 133 MHz, and serially inputs and outputs the data to and from the data bus at the operating frequency of 266 MHz which is double the operating frequency of the internal bus. The minimum burst length (referred to also as a base burst length) in the DDR is 2.

The I/O buffer of the DDR2 inputs and outputs 4-bit data in parallel to and from the memory core at the operating frequency of 133 MHz, and inputs and outputs the data serially to and from the data bus at the operating frequency of 533 MHz which is substantially four times the operating frequency of the internal bus. The minimum burst length in the DDR2 is 4.

The I/O buffer of the DDR3 inputs and outputs 8-bit data in parallel to and from the memory core at the operating frequency of 133 MHz, and inputs and outputs the data serially to and from the data bus at the operating frequency of 1066 MHz which is substantially eight times the operating frequency of the internal bus. The minimum burst length in the DDR3 is 8. In order to maintain compatibility with DDR2, the DDR3 has a function to support the burst length of 4 by destroying last 4 bits out of 8 bits held in the I/O buffer (burst chop function).

As described, the SDRAM increases the operating frequency of the external data bus, that is, increases memory bandwidth, by increasing the number of bits of the I/O buffer. In such a manner, the SDRAM compensates for the difficulty of increasing the operating frequency of the internal bus.

FIG. 1B is a diagram showing an example of a data arrangement for effective bank interleaving in a general DRAM. The data is arrangement includes data in a first bank, which are continuous with the same row address and has N bytes represented by "base burst length×bus width" (hereinafter, referred to as a base access unit), followed by data of the base access unit in a second bank. The examples of the base burst length are 1 for SDRAM, 2 for DDR, 4 for DDR2, and 8 for DDR3. Subsequently, continuous data with the same row address in a M-th bank is arranged in the similar manner. This allows efficient bank interleaving because multiple banks appear evenly at the time of memory access. FIG. 1B shows an example where two banks are included. In a general DRAM, it is not possible to transfer data less than the base burst length (data of "base burst length×bus width" is always input or output upon one access request); and thus, the base access unit is the same as the minimum access unit.

FIG. 2 shows an example where access to unnecessary data occurs in the data sequence arranged as in FIG. 1B. In the case where the data area of the requested access (hereinafter, referred to as an access requested area) is N bytes starting from the middle of the base access unit as shown in FIG. 2, a data request is required for all base access units including the access requested area, because the minimum access unit is, the same as the base access unit. As a result, it is necessary to access to 2N bytes (hereinafter, referred to as an access required area) as shown in FIG. 2. Although the access required area is 2N bytes, the access requested area is only N byte. The data of N-byte that is the difference between the two results in unnecessary data, which leads to a decrease in data transfer efficiency.

CITATION LIST

Patent Literature

PTL 1
Japanese Unexamined Patent Application Publication No. 9-190376

SUMMARY OF INVENTION

Technical Problem

However, in more advanced image compressing techniques such as MPEG 4 or H.264, decode processing is often carried out in small unit of pixels such as 4×4 or 8×8 so that lower bit rate and higher compression rate can be achieved compared to conventional image compressing techniques, while maintaining a higher definition image quality. In order to carry out decode processing in such smaller unit of pixels, data in smaller unit of pixels need to be obtained from the memory. However, if a method, in which the bus width of the memory is increased, is employed to achieve higher data transfer capability, a large amount of data is obtained at a time, resulting in an increase in access to unnecessary data. This leads to a decrease in data transfer efficiency. If a method is employed where the operating frequency is increased, the maximum bandwidth of the system is improved, for example, by increasing the operating frequency bandwidth of the DDR2 to the operating frequency bandwidth of the DDR3. However, at the same time, the minimum bust length in one command unit increases, which leads to an increase in the minimum data amount in one access. As a result, access to unnecessary data increases, which decreases data transfer efficiency in the same manner.

In a general DRAM, data of "bus width×base burst length" is transferred to a single bank in one access. In an enhanced DRAM, banks in the DRAM are divided into multiple groups (for example, groups A and B). After half of a transfer with a group (for example, group A), a transfer with a different group (for example, group B) can be inserted, which allows access at half the original burst length. For example, in an enhanced DRAM where the base burst length is 8, and eight banks are included, the banks are divided into two groups A and B each having 4 banks. After data is transferred at a bust length of 4 to the bank 0 of group A, data can be transferred at a burst length of 4 to the bank 0 (or 1, 2, or 3) of group B. Subsequently, data is transferred to the bank 0 (or 1, 2, or 3) of the group in the similar manner. In such a manner, data less than the base burst length can be transferred. In order to effectively use the enhanced DRAM, control is performed in consideration only with banks in conventional techniques. However, such a control hardly improves data transfer efficiency. In addition, control in consideration simply with groups may encounter a case where transfer to a same group continues, which leads to a decrease in data transfer efficiency.

The present invention has been conceived to solve the conventional problems, and has an object to provide a memory controller, a memory system, a semiconductor integrated circuit, and a memory control method which perform efficient data transfer by using an enhanced DRAM having banks divided into multiple groups.

Solution to Problem

In order to solve the problems, a memory controller according to an aspect of the present invention is a memory controller which controls access to a memory including a first group, a second group, and a prefetch buffer of N bits (where N is an integer number of two or more), each of the first group and the second group including a plurality of banks, the memory storing image data and being accessed in burst mode at a burst length of N. The memory controller includes: a command generation unit which generates a plurality of access commands each including a physical address, based on an access request including a logical address indicating a rectangular area in the image data; and a command issuance unit which issues, to the memory, the plurality of access commands generated by the command generation unit. The command generation unit includes a group determination unit which determines a group to which a bank including data to be accessed belongs, based on the physical address corresponding to the access request. The command generation unit generates the plurality of access commands including a first access command and a second access command, in the case where the data to be accessed is continuous across two banks belonging to different groups. The first access command is a command for accessing to a bank belonging to the first group, using a half of the prefetch buffer, and the second access command is a command for accessing to a bank belonging to the second group, using a remaining half of the prefetch buffer, the second access command sharing the prefetch buffer with the first access command.

With this structure, data transfer efficiency can be increased by using an enhanced memory including a prefetch buffer that can be shared between two banks belonging to different groups, and by paring accesses of half the original base burst length.

Here, it may be that the memory controller is connected to a plurality of memories including the memory, and the command generation unit further includes a memory determination unit which determines, from among the plurality of memories, a memory to which the data to be accessed belongs, based on the physical address corresponding to the access request. It may also be that the command generation unit generates the plurality of access commands including the first access command and the second access command based on the determinations made by the group determination unit and the memory determination unit, in the case where the data to be accessed belongs to a single memory and is continuous across two banks belonging to different groups.

With this structure, commands from a master can be accessed individually by each memory and each group, thereby improving the access efficiency.

Here, it may be that the image data includes data blocks each of which belongs to a group different from a group to which an adjacent data block belongs, the data blocks each being S pixels (where S is an integer number of two or more) that are continuous in a row direction of the pixel data.

With the structure, it is possible to generate pairs of access commands (first and second access commands) as many as the number of the borders between the data blocks.

Here, it may be that the data block is half a size of data that is accessed in the burst mode at the burst length of N.

With this structure, it is possible to generate only the pairs of access commands (first and second access commands) while excluding non-pair access commands. As a result, access at a burst length of N/2 is substantially repeated, thereby increasing data transfer efficiency.

Here, it may be that the data block is a minimum access unit

With this structure, it is possible to generate only the pairs of access commands (first and second access commands) while excluding non-pair access commands. As a result, access of burst length of N/2 is substantially repeated, thereby increasing data transfer efficiency.

Here, it may be that M data blocks (where M is an integer number of 2 or more) that are adjacent in a column direction belong to a same group which is different from a group to which other M data blocks adjacent to the M data blocks in the column direction belong.

With this structure, a case can be increased where a prefetch buffer can be shared between two banks belonging to different groups even when the row to be accessed is transited to another row, particularly in accessing to a rectangular area.

Here, it may be that a row that is accessed based on the second access command is an M-th line in the column direction from a row to that is accessed based on the first access command. Here, it may be that M is 2.

With this structure, even in the case of field read-out and frame read-out of a rectangular area, a case can be increased where a prefetch buffer is shared.

Furthermore, a memory system according to an aspect of the present invention is a memory system including a memory and the memory controller, the memory storing image data and being accessed in burst mode at a burst length of N where N is an integer number of two or more. The memory includes: a first group including a plurality of banks; a second group including a plurality of banks; and a prefetch buffer of N bits. The prefetch buffer includes a first operating mode where N-bit data is prefetched from one of the plurality of banks and a second operating mode where N/2-bit data is prefetched from each of two banks belonging to different groups.

A memory control method according to an aspect of the present invention is a memory control method for controlling access to a memory including a first group, a second group, and a prefetch buffer of N bits (where N is an integer number of two or more), each of the first group and the second group including a plurality of banks, the memory storing an image data and being accessed in burst mode at a burst length of N. The method includes: generating a plurality of access commands each including a physical address, based on an access request including a logical address indicating a rectangular area in the image data; and issuing, to the memory, the plurality of access commands generated in the generating. In the generating, it is determined whether or not data to be accessed is continuous across two banks belonging to different groups, based on the physical address corresponding to the access request, and a first access command and a second access command are generated based on the determination. The first access command is a command for accessing to a bank belonging to the first group, using a half of the prefetch buffer, and the second access command is a command for accessing to a bank belonging to the second group, using a remaining half of the prefetch buffer, the second access command sharing the prefetch buffer with the first access command.

With the memory control method according to an aspect of the present invention, access to a plurality of groups is performed in parallel by including a command generation unit which receives a memory access request from a master and generates an access command to a memory, a group determination unit which determines, in the command generation unit, a group to which a bank including groups in a memory belongs, a command issuance unit which issues, to the memory, a memory command generated by the command generation unit, and a data control unit which transfers data based on a command order issued by the command issuance unit.

With this structure, data can be efficiently transferred by arranging necessary data in different groups relatively evenly, and switching the groups for each access of half the original base burst length when accessing to small units of pixel data.

Advantageous Effects of Invention

In accordance with the memory controller and memory control method according to the present invention, in the case where a DRAM is used which has higher data transfer capability because a system as a whole requires higher bandwidth, it is possible to achieve an image processing technique, such as H.264, which processes small unit of pixels with less data transfer capability, by using an enhanced DRAM including banks divided into multiple groups, arranging necessary data relatively evenly into different groups, and accessing while switching the groups. This allows a system with higher data transfer efficiency without using a memory module with higher capability.

Information About Technical Background to this Application

The disclosure of Japanese Patent Application No. 2008-111185 filed on Apr. 22, 2008 including specification, drawings and claims is incorporated herein by reference in its entirety.

BRIEF DESCRIPTION OF DRAWINGS

FIG. 1A is a diagram showing types of DRAMs, operating frequency and burst length according to a conventional technique.

FIG. 1B is a diagram showing data arrangement adopted to bank interleaving in a conventional DRAM.

FIG. 2 is a diagram showing an example where access to unnecessary data occurs in the data arrangement shown in FIG. 1B.

FIG. 3A is a block diagram showing a configuration of an enhanced DRAM included in a memory according to Embodiment 1 of the present invention.

FIG. 3B Is a diagram showing an example of memory data arrangement according to Embodiment 1 of the present invention.

FIG. 4 shows an access required area when an access request as shown in FIG. 2 occurs in the data arrangement of FIG. 3B.

FIG. 11 is a diagram showing an image access method employed in the memory control method according to Embodiment 1 of the present invention.

FIG. 12 is a diagram showing an image access method employed in the memory control method according to Embodiment 1 of the present invention.

DESCRIPTION OF EMBODIMENTS

Figure 5A:
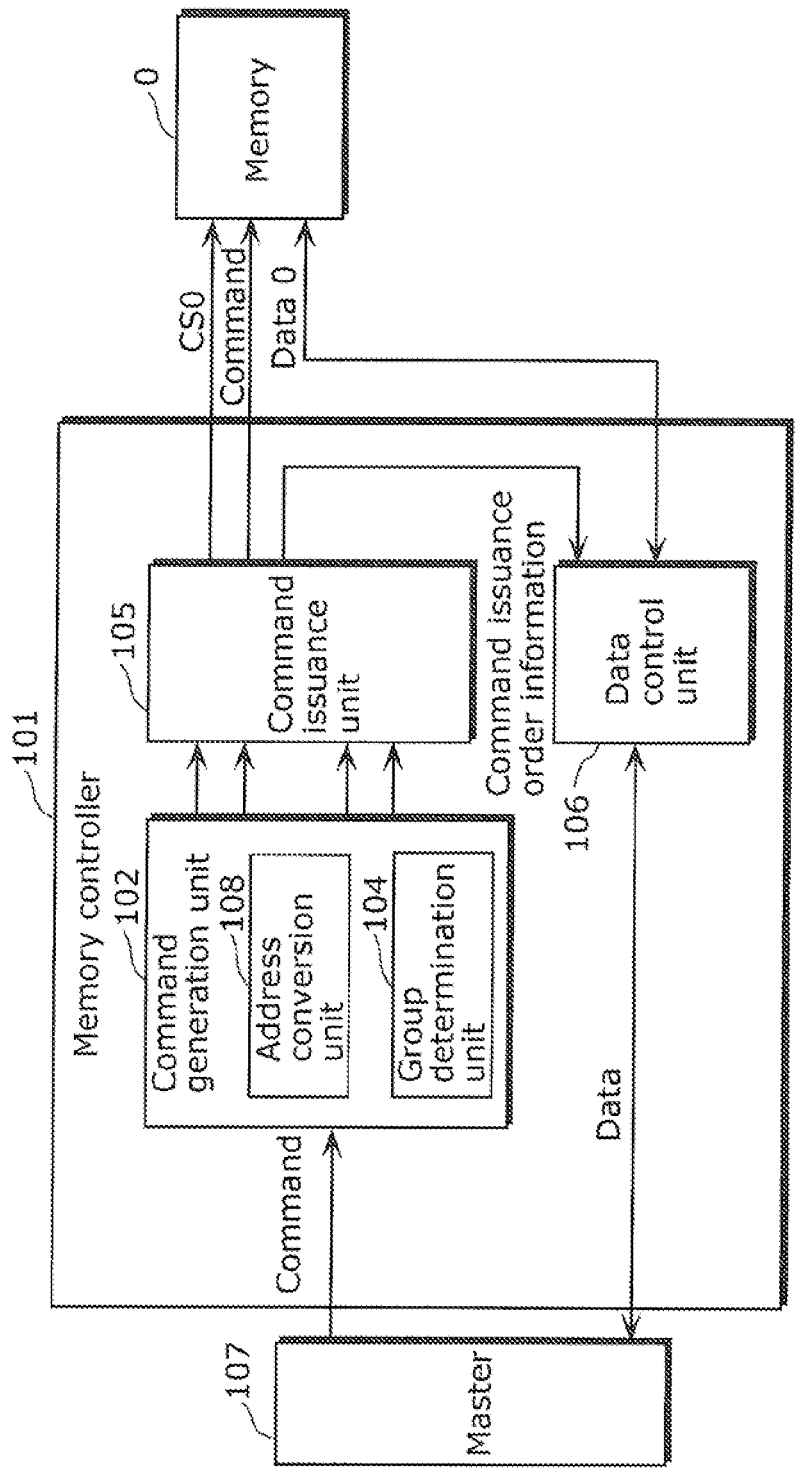
FIG. 5A is a block diagram showing a configuration of a memory controller according to Embodiment 1 of the present invention.

Hereinafter, references are made to Embodiments of the present invention with reference to the drawings.

Embodiment 1

A memory controller according to Embodiment 1 includes a first group including multiple banks, a second group including multiple banks, and a prefetch buffer of N bits (where N is an integer number of 2 or more). The memory controller controls access to a memory which stores image data and is accessed in burst mode at a burst length of N.

First, a reference is made to a configuration example of a memory that is accessed by a memory controller.

FIG. 3A is a block diagram showing a configuration example of a DRAM included in a memory that is accessed by a memory controller according to Embodiment 1 of the present invention. The data bus includes a bus width of multiple bits such as 32 bits or 64 bits, but for simplification of the description, FIG. 3A shows only a portion corresponding to 1 bit. For example, in the case of a memory data bus of 32 bits, the memory has thirty two parallelized DRAMs shown in FIG. 3A.

A DRAM 201 shown in FIG. 3A includes: a first group A having four banks A0 to A3; a second group B having four banks B0 to B3; a prefetch buffer 202 of N bits (where N is 8 in FIG. 3A); and a parallel-serial conversion unit (hereinafter, referred to as a P-S conversion unit) 203. The DRAM 201 is an enhanced DDR3 (hereinafter, referred to as an enhanced DRAM).

Each of the banks A0 to A3 and B0 to B3 corresponds to a single memory cell array, and inputs and outputs, to and from the prefetch buffer 202, 1-bit data of the memory cell array designated by a row address and a column address. It is sufficient that the operating frequency of each bank is 133 MHz.

The prefetch buffer 202 includes at least two operating modes, that is, a first operating mode and a second operating mode.

The first operating mode is a normal access mode same as that of DDR3, as indicated by dashed lines and brackets in FIG. 3A. More specifically, in the first operating mode, the prefetch buffer 202 inputs and outputs, to and from one bank designated by the addresses, 8-bit data in parallel at the operating frequency of 133 MHz, and serially inputs and outputs the data to and from the data bus via the P-S conversion unit 203 at the operating frequency of 1066 MHz which is eight times the operating frequency of the internal bus.

The second operating mode is a mode where the prefetch buffer 202 is shared in two equal parts between one of the banks in the first group and one of the banks in the second group, as indicated by solid arrows and brackets. More specifically, in the second operating mode, the prefetch buffer 202 inputs and outputs data, in parallel, between the half of the prefetch buffer 202 (for example, top 4 bits) and one of the banks in the first group at the operating frequency of 133 MHz, and simultaneously inputs and outputs data, in parallel, between the remaining half of the prefetch buffer 202 (for example, bottom 4 bits) and one of the banks in the second group at the operating frequency of 133 MHz. Furthermore, in the second operating mode, the prefetch buffer 202 serially inputs and outputs 8-bit data to and from the data bus via the P-S conversion unit 203 at the operating frequency of 1066 MHz that is eight times the operating frequency of the internal bus.

Whether the enhanced DRAM operates in the first operating mode or in the second operating mode is determined by an access command (hereinafter, referred to as a memory command) provided to the enhanced DRAM from the master via the memory access controller. The first operating mode is executed by one memory command.

The second operating mode is executed by two memory commands that are paired (hereinafter, referred to as a first memory command and a second memory command).

The first memory command is a command for accessing to a bank belonging to the first group, using the half of the prefetch buffer.

The second memory command is a command for accessing to a bank belonging to the second group, using the remaining half of the prefetch buffer, while sharing the prefetch buffer with the first memory command.

In such a manner, the enhanced DRAM supports the second operating mode, thereby causing the prefetch buffer 202 to be shared by two memory commands each for an access at a burst length of N/2 that is half the base burst length N (here, N is 8, and thus, half of the original burst length N/2 is 4). As a result, compared to the first operating mode where access is made at the base burst length of N, unnecessary data is eliminated in the second operating mode, which leads to an increase in the use efficiency of the data bus. Note that the number of the groups in the memory may be two, three, or any numbers as long as the groups exclusively include banks. In addition, the number of banks in each group may be one or more.

FIG. 3B is a diagram showing an example of data arrangement for effective bank interleaving in the case where the enhanced DRAM includes two groups. In the data arrangement, data in the first group, which is continuous with the same row address and has N/2 bytes represented by "base burst length×bus width/2", and data in the second group, which is continuous with the same row address and has N/2 bytes represented by "base burst length×bus width/2", are alternately arranged. In the enhanced DRAM, if the data to be accessed includes different groups, transfer of data of another group can be paired with transfer of data less than the base access unit. Thus, if the number of the groups is two and the base access unit can be interrupted at its midpoint, the minimum access unit is the same as the base access unit/2.

Note that the number of the groups here is two, but two or more groups may be included.

FIG. 4 shows an access required area when an access request same as that shown in FIG. 2 occurs in the data arrangement of FIG. 3B. Since the minimum access unit is half the base access unit, the access requested area and the access required area are the same, which prevent unnecessary data access.

FIG. 5A is a block diagram showing a configuration of the memory controller according to Embodiment 1 of the present invention. A memory controller 101 in FIG. 5A includes a command generation unit 102, a command issuance unit 105, and a data control unit 106. The command generation unit 102 includes an address conversion unit 108 and a group determination unit 104.

In FIG. 5A, a master 107 issues, to the memory controller 101, a command for accessing a memory (hereinafter, referred to as a master command). The command generation unit 102 generates a command to be issued to the memory (hereinafter, referred to as a memory command) upon receipt of the master command issued by the master 107, and passes the memory command to a command issuance unit 105. The group determination unit 104 in the command generation unit 102 determines to which group out of multiple groups in the memory the access of the memory command generated based on the master command is directed. If the master command is for an access to a single unit area, the access includes access to the same memory and to multiple groups (for example, group A and group B). The memory commands, generated by the command generation unit 102 which includes the group determination unit 104, are sorted into groups and passed to the command issuance unit 105. The command issuance unit 105 controls, according to the memory command generated by the command generation unit 102, issuance of commands to the memory, such as ACTIVATE, READ, WRITE, and PRECHARGE, and issuance timing of the memory commands based on, for example, AC specification. The data control unit 106 receives, from the command issuance unit 105, command issuance order information of the memory command issued to the memory 0. When the memory command is for write access to the memory, the data control unit 106 receives data from the master 107 and transfers the data to the memory 0 according to the command issuance order information. When the memory command is for read access from the memory, the data control unit 106 receives data from the memory 0, and transfers the data to the master 107 according to the command issuance order information.

Figure 5B:
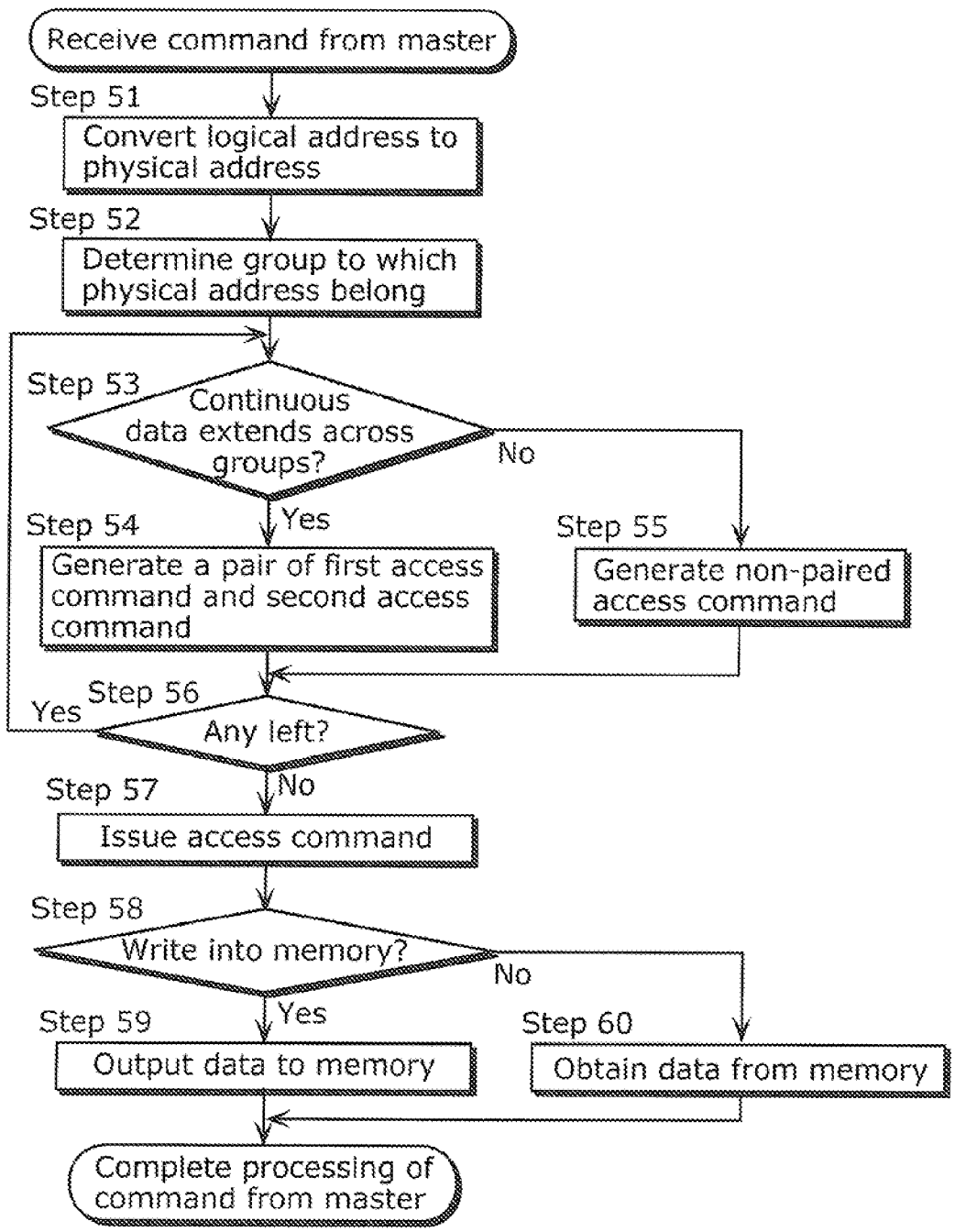
FIG. 5B is a flowchart showing a memory access control method according to Embodiment 1 of the present invention.

FIG. 5B is a flowchart showing a memory access control method in the memory controller according to the present embodiment. A reference is made to the case where a master command includes a logical address indicating a rectangular area in image data.

The memory access control method mainly includes two operations. First, the command generation unit 102 generates multiple access commands (memory commands) including physical addresses based on the access request (master command) including a logical address indicating a rectangular area in image data (Steps 51 to 56). Next, the command issuance unit 105 and the data control unit 106 issue the memory commands generated by the command generation unit 102 to the memory, and transfers the accessed data (Steps 57 to 60).

More specifically, the address conversion unit 108 holds inside a correspondence table between logical addresses and physical addresses or conversion rule. Upon receipt of the master command including the logical address, the address conversion unit 108 converts the logical address representing the rectangular area into multiple physical addresses (Step 501).

For example, in the case where the logical address represents the rectangular area corresponding to the "necessary data" in FIG. 11, the address conversion unit 108 converts the logical address into four sets of physical addresses. In other words, the first set includes the physical addresses indicating the hatched area of the data blocks 0, 8 and 4. The second set includes the physical addresses indicating the hatched area of the data blocks 1, 9, and 5. The third set includes the physical addresses indicating the hatched area of the data blocks 2, 10, and 6. The fourth set includes the physical addresses indicating the hatched area of the data blocks 3, 11, and 7.

The group determination unit 104 determines to which group the bank corresponding to the set of the converted physical addresses belongs (Step 52). Furthermore, when the data to be accessed indicated by the set of the physical addresses are continuous across two banks belonging to different groups, the command generation unit 102 generates a pair of a first access command and a second access command (Steps 53 and 54), and when not, the command generation unit 102 generates a single memory command which is not paired (Steps 53 and 55). Here, as already described earlier, the pair of the first access command and the second access command share the prefetch buffer 202 by two equal parts.

The command generation unit 102 returns to Step 53 for continuing processing when there are sets of unprocessed physical addresses left, and continues processing at Step 57 when no set of to unprocessed physical addresses is left (Step 56).

The command issuance unit 105 controls, according to the respective memory commands generated by the command generation unit 102, issuance of commands to the memory, such as ACTIVATE, READ, WRITE, and PRECHARGE, and issuance timing of the memory commands. The data control unit 106 receives the command issuance order information of the memory commands from the command issuance unit 105. At the time of write access to the memory, the data control unit 106 receives data from the master 107, and transfers the data to the memory 0 according to the command issuance order information. At the time of read access to the memory, the data control unit 106 receives data from the memory 0 and transfers the data to the master 107 according to the command issuance order information.

Figure 6:
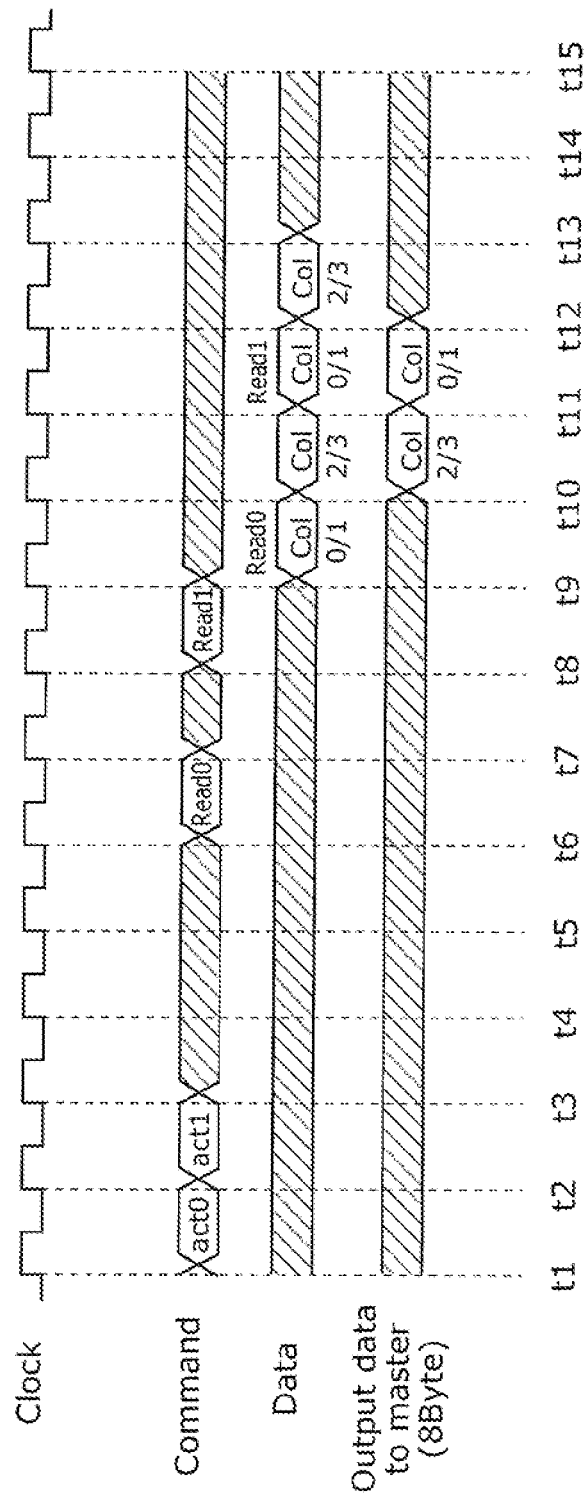
FIG. 6 is a diagram showing an example of timing chart in a memory control method according to a conventional technique.

FIG. 6 shows, as a comparative example, a timing chart on the memory bus when a Read access, shown in FIG. 2 as the conventional technique request, is made. Here, an example case is described where DRAM to be accessed is DDR2 having a bus width of 32 bits, and a base burst length of 4. In the case where a request is made for N bytes staring from the middle of the base access unit as shown in FIG. 2, Read 0 is issued at time t7 for reading the base access unit of the second bank. Next, Read 1 is issued at time t9 for reading the base access unit of the first bank. At times t10 and t11, Read data in the base access unit of the second bank is obtained, and at times t12 and t13, Read data in the base access unit of the first bank is obtained. However, the data in the access requested area is only data of the times t11 and t12; and thus, it is sufficient to output, to the master, only data of the times t11 and t12. As a result, of the Read data obtained at times t10 to t13, only data at t11 and t12 are effective, which makes the transfer efficiency 50%.

Figure 7:
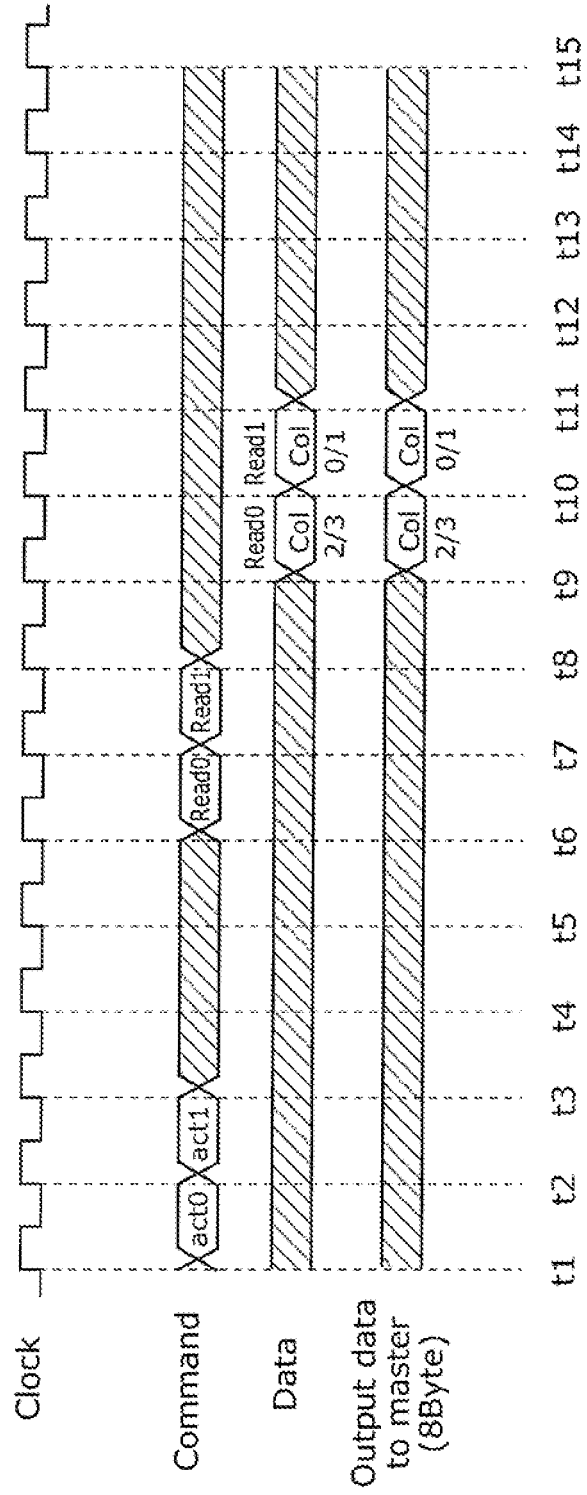
FIG. 7 is a diagram showing an example of timing chart in the memory control method according to Embodiment 1 of the present invention.

FIG. 7 is an example of timing chart on the memory bus when a Read access request shown in FIG. 4 is made. Similarly to FIG. 6, an example case is described where DRAM to be accessed is DDR2 having a bus width of 32 bit and a base burst length of 4. In the case where a request is made for N bytes staring from the middle of the base access unit as shown in FIG. 4, Read 0 is issued at time t7 for reading the base access unit of the second group. Next, Read 1 is issued at time t8 for reading the base access unit of the first group, because, in the enhanced DRAM, data to be accessed includes different groups, transfer of data of another group can be paired with transfer of data shorter than the base access unit. At time t10, Read data in the base access unit of the second bank is obtained, and at time t11, the read data in the base access unit of the first bank is obtained. Since the access requested area and the access required area are the same, it is sufficient to output data of time t10 and time 11 to the master. As a result, of the Read data obtained at times t10 and t11, effective data are the data of t10 and t11, which makes the transfer efficiency 100%.

The case has been described where the enhanced DRAM has a bus width of 32 bits and the base burst length of 4; however, the bus width and the base burst length can be other than the described example, such as the base burst length is 2 or more.

Figure 8:
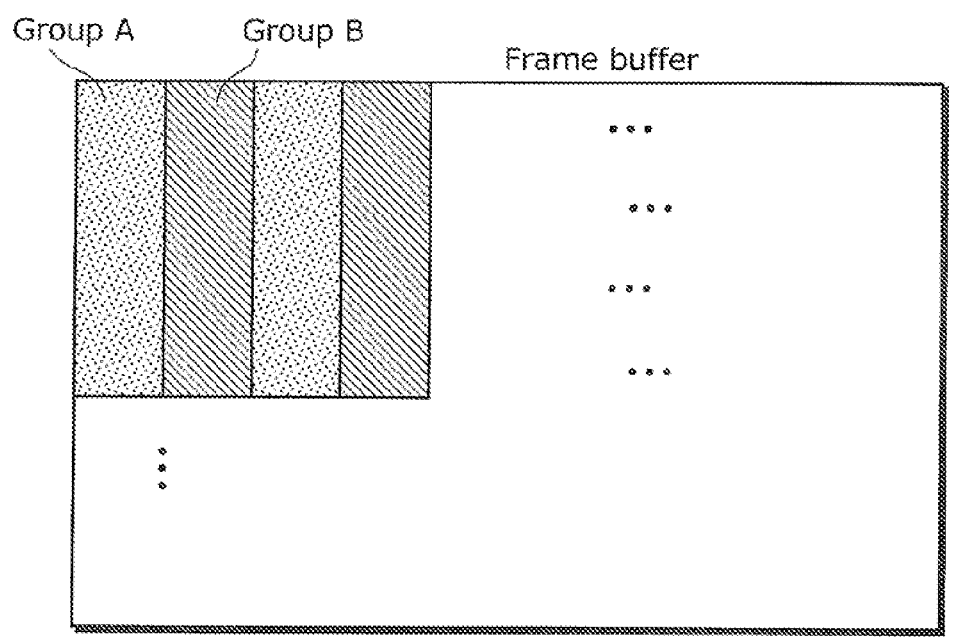
FIG. 8 is a diagram showing a configuration of a frame buffer in the memory control method according to Embodiment 1 of the present invention.

FIG. 8 shows an example of data arrangement for using the enhanced DRAM as a frame buffer. The frame buffer has two-dimensional data. FIG. 8 shows a data arrangement in a system configuration where, in data transfer to a memory, data that is accessed in the minimum access unit is a data block, the enhanced DRAM having two groups A and B is used, and a single memory 0 is used. Here, unit areas of different groups A and B are repeatedly arranged in the order of A, B, A, B in the horizontal direction, and the same group A or B is arranged in the vertical direction so as to be in stripes.

Figure 9:
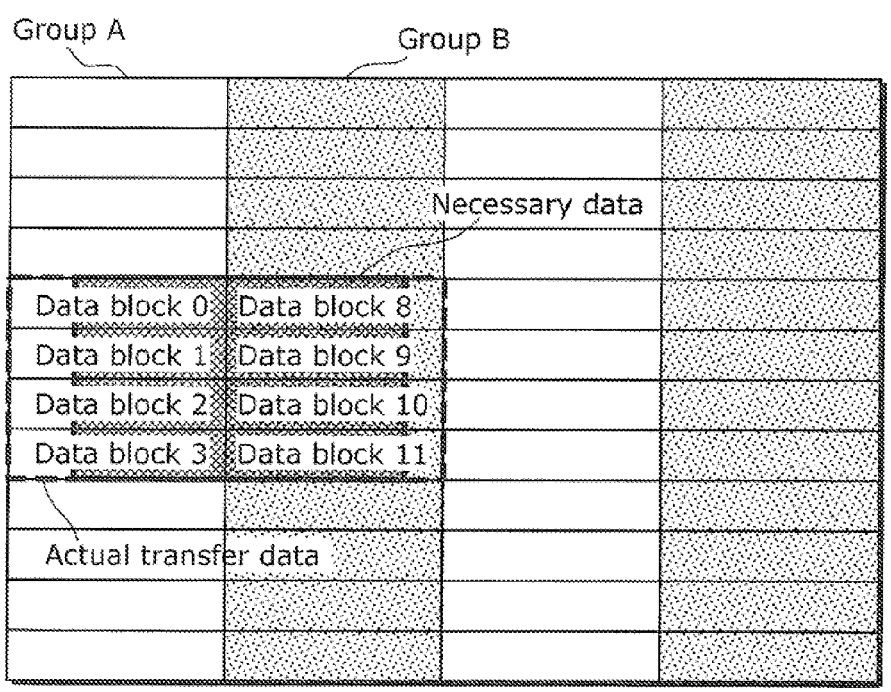
FIG. 9 is a diagram showing an image access method employed in the memory control method according to Embodiment 1 of the present invention.

FIG. 9 shows an example of the case where an access is made to rectangular pixel data in a frame buffer which employs the data arrangement shown in FIG. 8. When accessing the rectangular pixel data indicated as "necessary data" in FIG. 9, the minimum access unit in the DRAM is fixed; and thus, even when accessing given data, it is necessary to access data from a border to a border of data blocks as shown in FIG. 9. As a result, it is necessary to access the rectangular pixel data as indicated by "actual transfer data".

Figure 10:
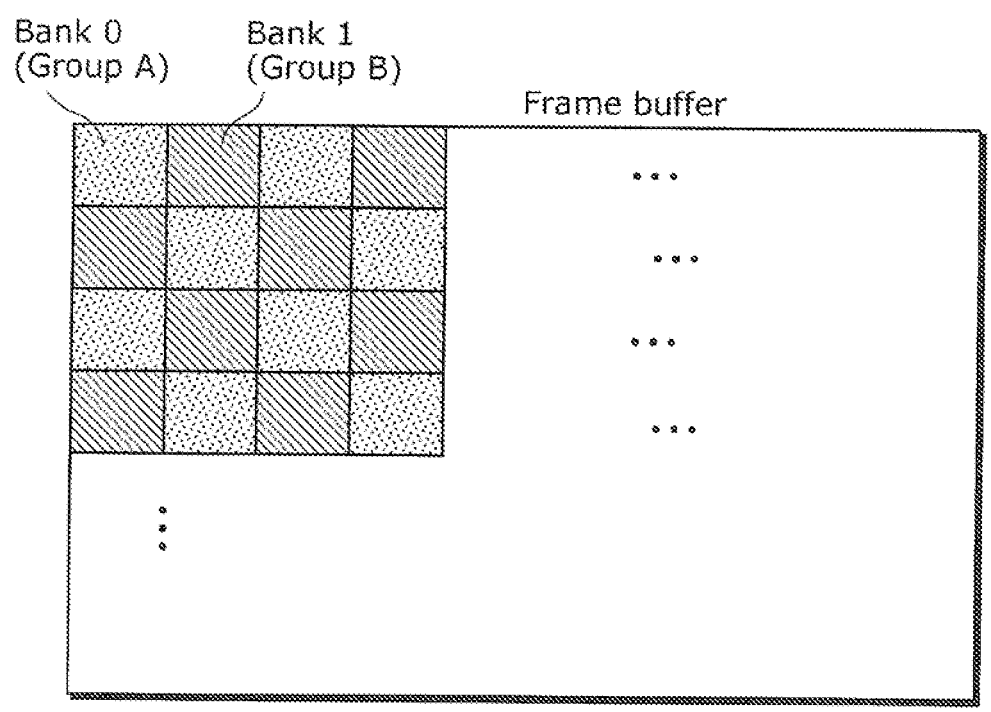
FIG. 10 is a diagram showing a configuration example of a frame buffer in the memory control method according to Embodiment 1 of the present invention.

FIG. 10 shows an example of data arrangement for using the enhanced DRAM as a frame buffer, which is different from the data arrangement shown in FIG. 8. The frame buffer has two-dimensional data. FIG. 10 shows a data arrangement in a system configuration, similar to FIG. 8, where, in data transfer to a memory, data that is accessed in the minimum access unit is a data block, the enhanced DRAM having two groups A and B is used, and a single memory 0 is used. Here, unit areas of different groups A and B are repeatedly arranged in the order of A, B, A, B in the horizontal direction, and groups A and B are arranged in the order of A, B, A, B in the vertical direction so as to form a gridlike pattern.

FIG. 11 shows an example where actual transfer data increases when a data request as shown in FIG. 11 is made to the frame buffer employing the data arrangement shown in FIG. 8 and data transfer efficiency is reduced. In the enhanced DRAM, if data to be accessed includes different groups, transfer of data of another group can be paired with transfer of data having a burst length shorter than the base access unit; and thus, for example, the data block 0 is paired with data block 8, and data block 1 is paired with data block 9. Although data block 2 can be paired with data block 10, and data block 3 can be paired with data block 11 in the similar manner, it is required to transfer data of group B which can be paired with data blocks 4, 5, 6, and 7. As a result, the data blocks 12, 13, 14, and 15 are also actually transferred, resulting in reduction in data transfer efficiency.

It has been described that pairing is repeated in combination such as the data block 0 and data block 8; however, any combinations are possible as long as data blocks in different groups are combined.

FIG. 12 shows an example of data that is actually transferred when the same data request as that in FIG. 11 is made to the frame buffer employing the data arrangement shown in FIG. 10. In the enhanced DRAM, data to be accessed includes different groups, transfer of data of another group can be paired with transfer of data having a burst length shorter than the base access unit; and thus, for example, the data block 0 is paired with data block 1, and data block 2 is paired with data block 3. If data blocks 8 and 9, data blocks 10 and 11, data blocks 4 and 5, and data blocks 6 and 7 are transferred, transmission efficiency can be further increased than that the data arrangement shown in FIG. 8.

It has been described that pairing is repeated in combination such as the data block 0 and data block 1; however, any combinations are possible as long as data blocks in different groups are combined.

Further, it may be that the image data includes data blocks each of which belongs to a group different from a group to which an adjacent data block belongs, the data blocks each being S pixels (where S is an integer number of two or more) that are continuous in a row direction of the pixel data. With this, it is possible to generate pairs (first and second access commands) as many as the number of the borders between data blocks.

Here, it may be that the data block is half a size of data that is accessed in the burst mode at the burst length of N. With this, it is possible to generate only pairs (first and second access commands) while excluding non-pair access commands. As a result, access at a burst length of N/2 is substantially repeated, which increases data transfer efficiency.

Further, it may be that the data block is the maximum access unit. With this, it is possible to generate only pairs (first and second access commands) while excluding non-pair access commands. As a result, access at a burst length of N/2 is substantially repeated, which increases data transfer efficiency.

Here, it may be that M data blocks (where M is an integer number of 2 or more) that are adjacent in a column direction belong to a same group which is different from a group to which other M data blocks adjacent to the M data blocks in the column direction belong. With this, particularly in an access to a rectangular area, a case can be increased where a prefetch buffer can be shared between two banks belonging to different groups even when the row to be accessed is transited to another row.

Here, it may be that a row that is accessed based on the second access command is an M-th line in the column direction from a row that is accessed based on the first access command.

Further, M may be 2. With this, even in the case of field read-out and frame read-out of a rectangular area, a case can be increased where a prefetch buffer is shared.

Further, it may be that a memory system according to an aspect of the present invention is a memory system including a memory and a memory controller, the memory storing image data and being accessed in burst mode at a burst length of N (where N is an integer number of two or more). The memory may include: a first group including a plurality of banks; a second group including a plurality of banks; and a prefetch buffer of N bits, and the prefetch buffer includes a first operating mode where N-bit data is prefetched from one of the plurality of banks and a second operating mode where N/2-bit data is prefetched from each of two banks belonging to different groups.

Embodiment 2

In Embodiment 2 of the present invention, like referential numerals are used to indicate like elements in Embodiment 1, and their descriptions are not repeated.

Figure 13:
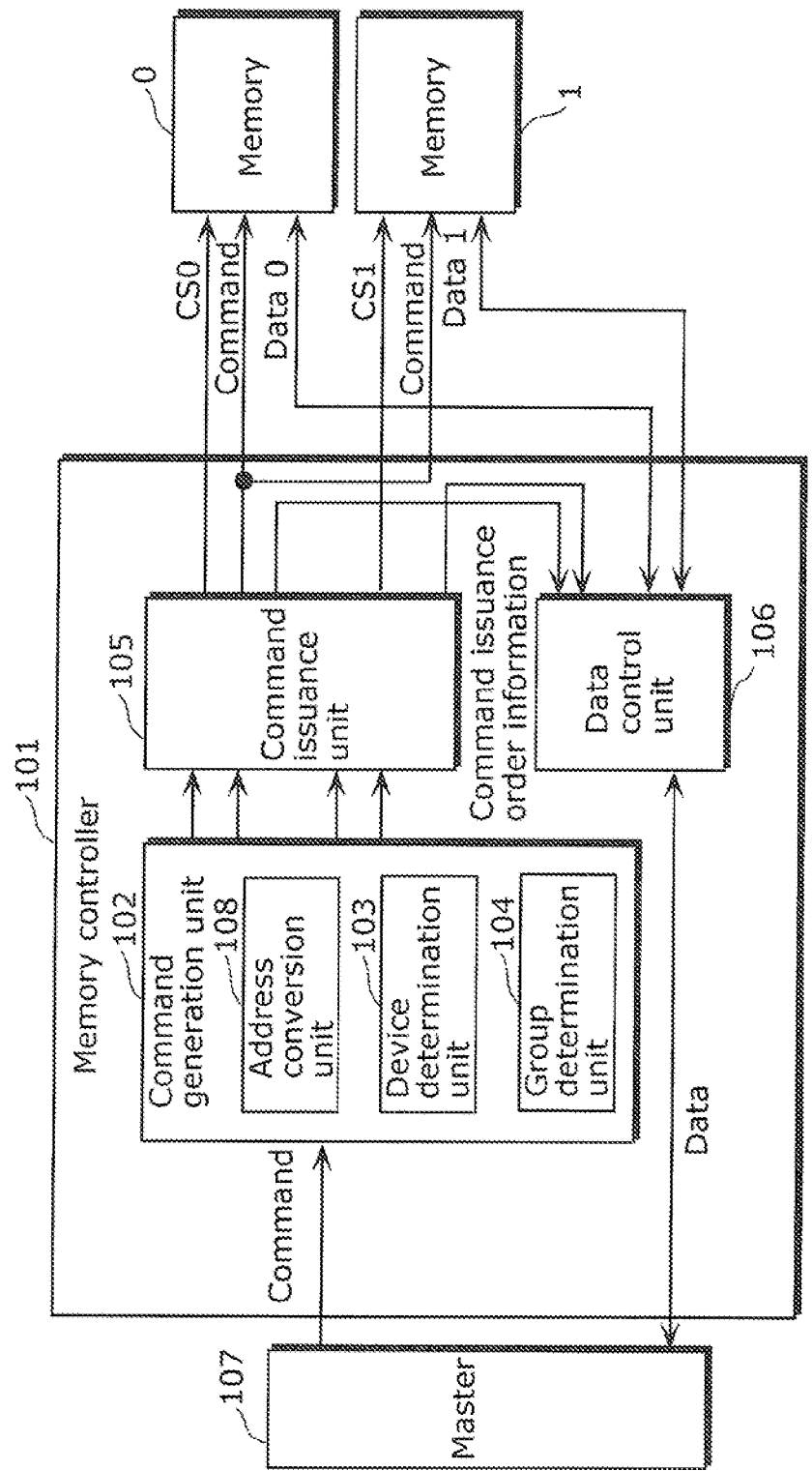
FIG. 13 is a block diagram showing a configuration of a memory controller according to Embodiment 2 of the present invention.

FIG. 13 is a block diagram showing a configuration of a memory, controller according to Embodiment 2 of the present invention.

In FIG. 13, a master 107 issues, to the memory controller 101, a command for accessing to a memory (hereinafter, referred to as a master command). A command generation unit 102 generates a command to be issued to the memory (hereinafter, referred to as a memory command) upon receipt of the master command issued by the master 107, and passes the memory command to a command issuance unit 105. The device determination unit 103 in the command generation unit 102 determines whether the memory command generated based on the master command of the master 107 is for an access to both memories 0 and 1, or for an access to either the memories 0 or 1. Similarly, the group determination unit 104 in the command generation unit 102 determines a group, among the groups in the memories, to which the access of the memory command generated based on the master command of the master 107 is directed. If the master command is for an access to a same unit area, the access includes access to the same memory and to multiple groups (for example, group A and group B). The memory commands, generated by the command generation unit 102 which includes the device determination unit 103 and the group determination unit 104, are passed to the command issuance unit 105 for each device and each group. The command issuance unit 105 controls, according to the memory command generated by the command generation unit 102, issuance of commands to the memory, such as ACTIVATE, READ, WRITE, or PRECHARGE, and issuance timing of the memory commands based on, for example, AC specification. The data control unit 106 receives, from the command issuance unit 105, command issuance order information of the memory command issued to the memories 0 and 1. When the memory command is for write access to the memory, the data control unit 106 receives data from the master 107 and transfers the data to the memories 0 and 1 according to the command issuance order information. When the memory command is for read access from the memory, the data control unit 106 receives the data from the memories 0 and 1, and transfers the data to the master 107 according to the command issuance order information.

Figure 14:
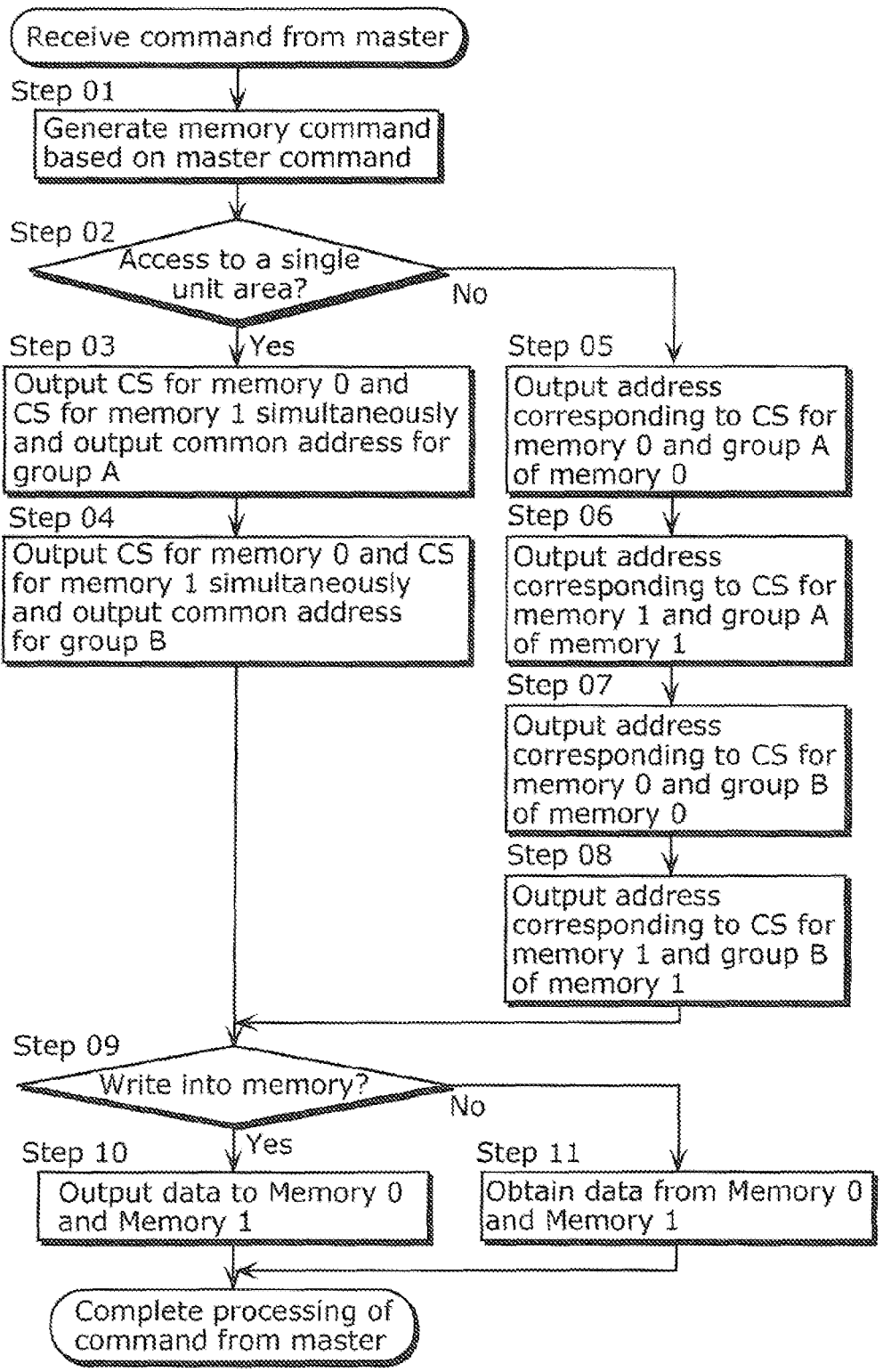
FIG. 14 is a flowchart showing a memory control method according to Embodiment 2 of the present invention.

FIG. 14 is a flowchart of a memory control method according to Embodiment 2 of the present invention.

In Step 01 of FIG. 14, the command generation unit receives an access request from the master 107. The device determination unit 103 and the group determination unit 104 determine to which of memory 0 or memory 1 the access is directed and determines to which group, among the groups, the access is directed to. Then, memory commands corresponding to the respective memories and groups are generated. In Step 02, the command issuance unit determines whether or not the generated memory command is for an access to a single unit area, and when it is an access to a single unit area, the processing continues at Step 03, and when not, the processing continues at Step 05. The processing at Step 03 to Step 08 will be performed by the command issuance unit. In Step 03, the command issuance unit simultaneously outputs, to the memories 0 and 1, memory commands having a common address to Group A. In Step 04, the command issuance unit simultaneously outputs, to the memories 0 and 1, memory commands having a common address to Group B. In Step 05, the command issuance unit outputs an address corresponding to the group A of the memory 0. In Step 06, the command issuance unit outputs an address corresponding to the group A of the memory 1. In Step 07, the command issuance unit outputs an address corresponding to the group B of the memory 0. In Step 08, the command issuance unit outputs an address corresponding to the group B of the memory 1. In Step 09, the data control unit determines whether the access is for memory write. When the access is for memory write, the processing continues at Step 10, and when not (the access is for memory read), the processing continues at Step 11. In Step 10, the data control unit receives, from the master 107, data to the memories and outputs the data to the memories 0 and 1 according to the command issuance order information. In Step 11, data are received from the memories 0 and 1, and are transferred to the master according to the command issuance order information.

The memory command generation processing in Step 01 is almost identical to the processing in Steps 51 to 56 in FIG. 5B, but is different in the following points. More specifically, the command generation unit 102 generates, based on the determinations made by the group determination unit 104 and the device determination unit 103, a pair of a first memory command and a second memory command in the case where data to be accessed belongs to a single memory and is continuous across two banks belonging to different groups.

Figure 15:
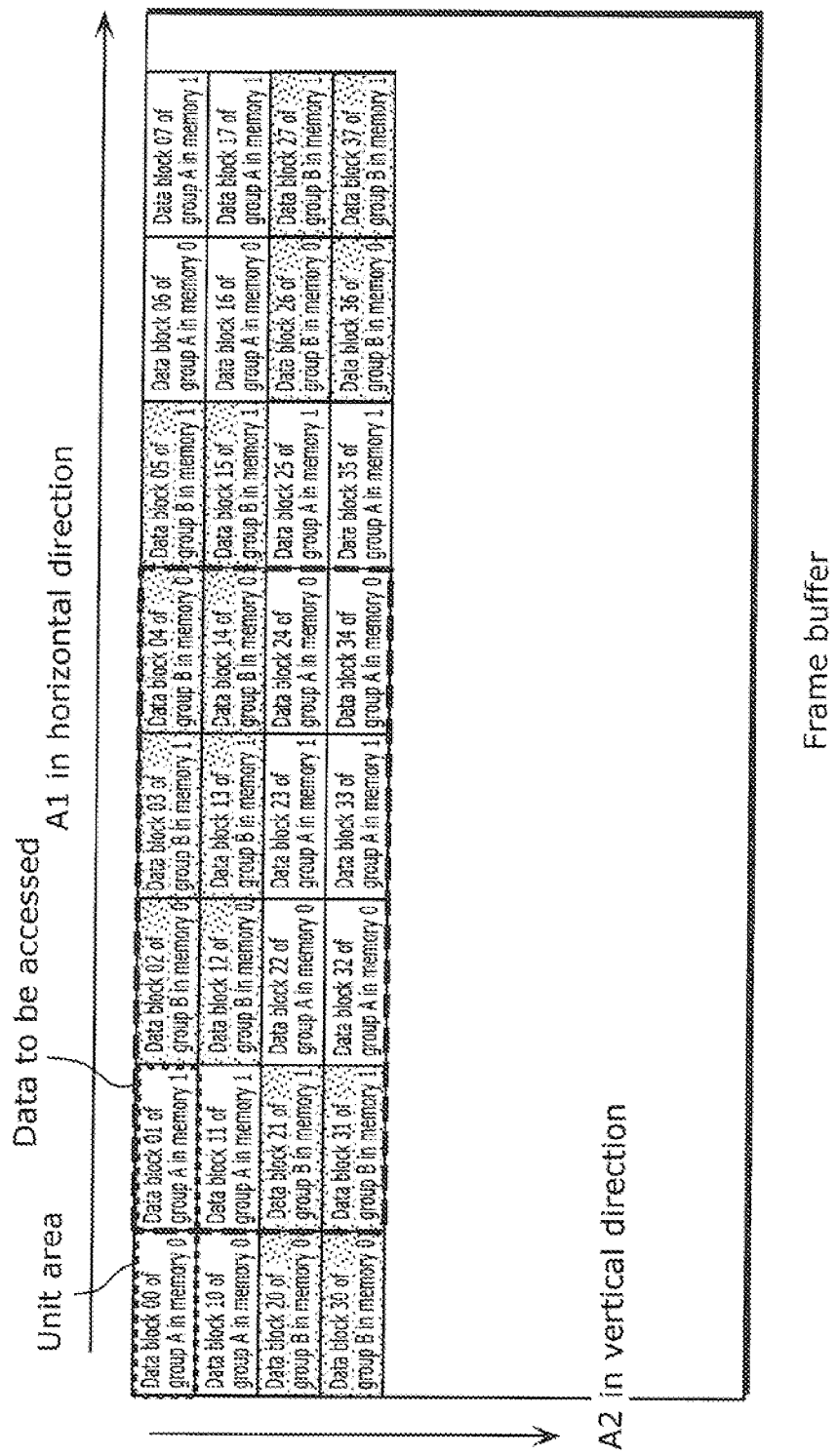
FIG. 15 is a diagram showing a configuration example of a frame buffer according to Embodiment 2 of the present invention.

FIG. 15 shows an example of data arrangement for using a memory as a frame buffer. The frame buffer has two dimensional data, and includes A1 pixel data in the horizontal direction and A2 pixel data in the vertical direction. FIG. 15 shows a data arrangement in a system configuration where, in data transfer to the memories, data that is accessed in a minimum access unit is a data block, a DRAM having two groups A and B is used, and two memories 0 and 1 are used. Here, unit areas of different groups A and B are repeatedly arranged in the order of A, B, A, B in the horizontal direction, and groups A and B are arranged for each two line (such as A, A, B, B) in the vertical direction. When accessing rectangular pixel data in such a frame buffer, the minimum access size in the DRAM is fixed; and thus, even when accessing given data, it is necessary to access data from a border to a border of data blocks as shown in FIG. 15.

Figure 16:
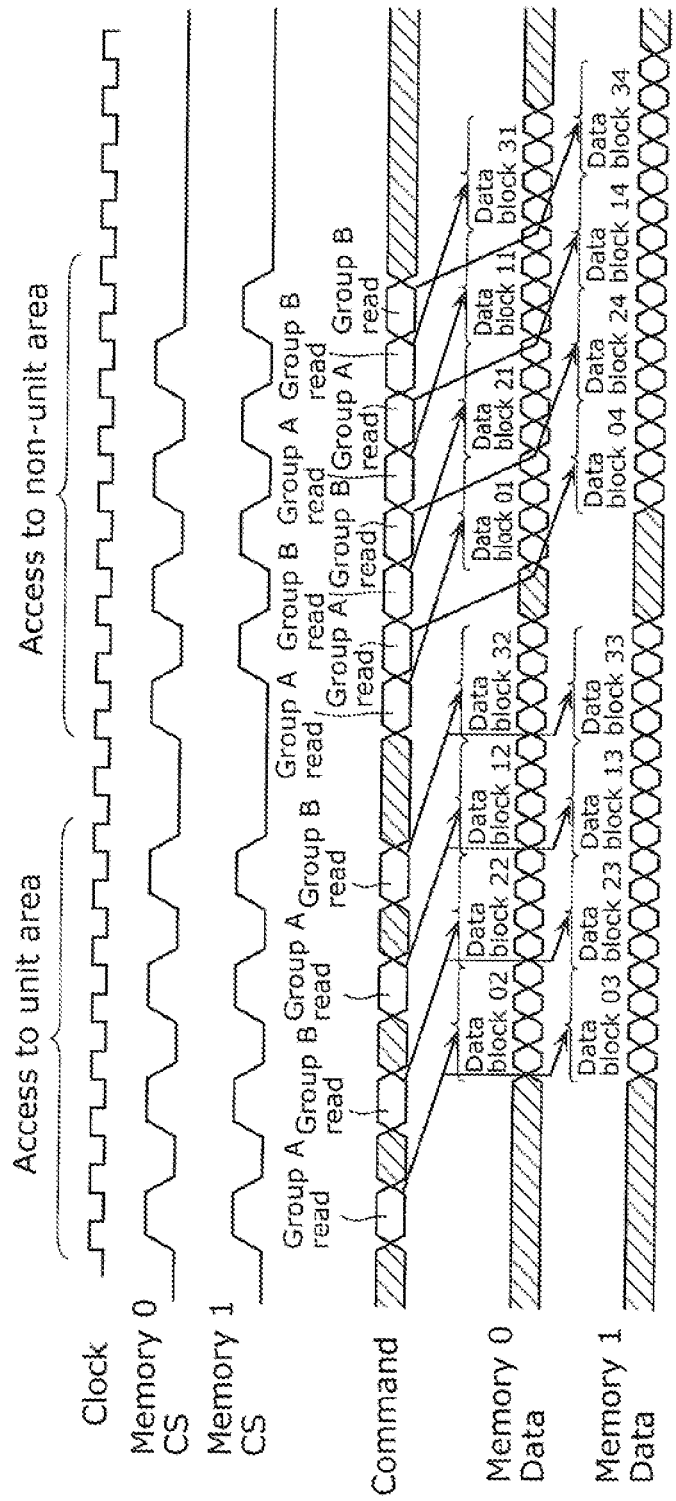
FIG. 16 is a diagram showing an example of timing chart at the time of an image access according to Embodiment 2 of the present invention.

FIG. 16 is an example of timing chart on a memory bus when obtaining rectangular pixel data in FIG. 15. When accessing a rectangular pixel data and accessing a unit area, a common address is concurrently accessed while chip select signals (CS0, CS1) for the memories 0 and 1 concurrently being held in the active state. In an access to non-unit area, different addresses are accessed while chip select signals for the memories 0 and 1 being held in the active state at different times.

With this structure, the device determination unit and the group determination unit are included in the command generation unit. This allows commands from the master to access each device and each group individually, which increases access efficiency.

In Embodiment 2, a command bus is provided for outputting commands from the command issuance unit to the memories 0 and 1; however, a separate command line may be provided, or only part of a command bus may be commonly used, for example, such as only the upper bits or the lower bits in the address.

Note that data arrangement in a frame buffer is not limited to the data arrangement described in Embodiment 2; such data arrangement may also be possible that data blocks of group A and group B are alternately arranged in the horizontal direction, and data with the same group, the same bank, and the same row are arranged in the vertical direction. In such a case, it may be that (I) column addresses in a data block are continuous in the horizontal direction, (II) column addresses in a data block are continuous in the horizontal direction and the column addresses in the data block are continuous to the column addresses of a data block in the following line, or (III) column addresses in a data block are continuous in the horizontal direction and the column addresses in the data block are continuous to the column addresses of a data block in the line two lines below. In the case where column addresses are continuous to the column addresses in a data block in the two lines below a method may be used where a data block at the two lines below is accessed after accessing to a given data block in an image access, similar to the present Embodiment. In the above case, the data arrangement in the present embodiment includes different groups for each two lines. Since the data is in the same bank and the same row, an access may be made at the burst length extended as many as multiple data blocks, although a command is generally issued for each data block for an access.

Further, it has been described in the embodiments that the prefetch buffer 202 is shared by two banks belonging to two different groups; however, the prefetch buffer 202 may be shared by three or more banks belonging to three or more different groups. In this case, where the number of banks sharing the prefetch buffer 202 of N bits is m, N/m bit is used by each bank sharing the prefetch buffer 202.

Figure 17:
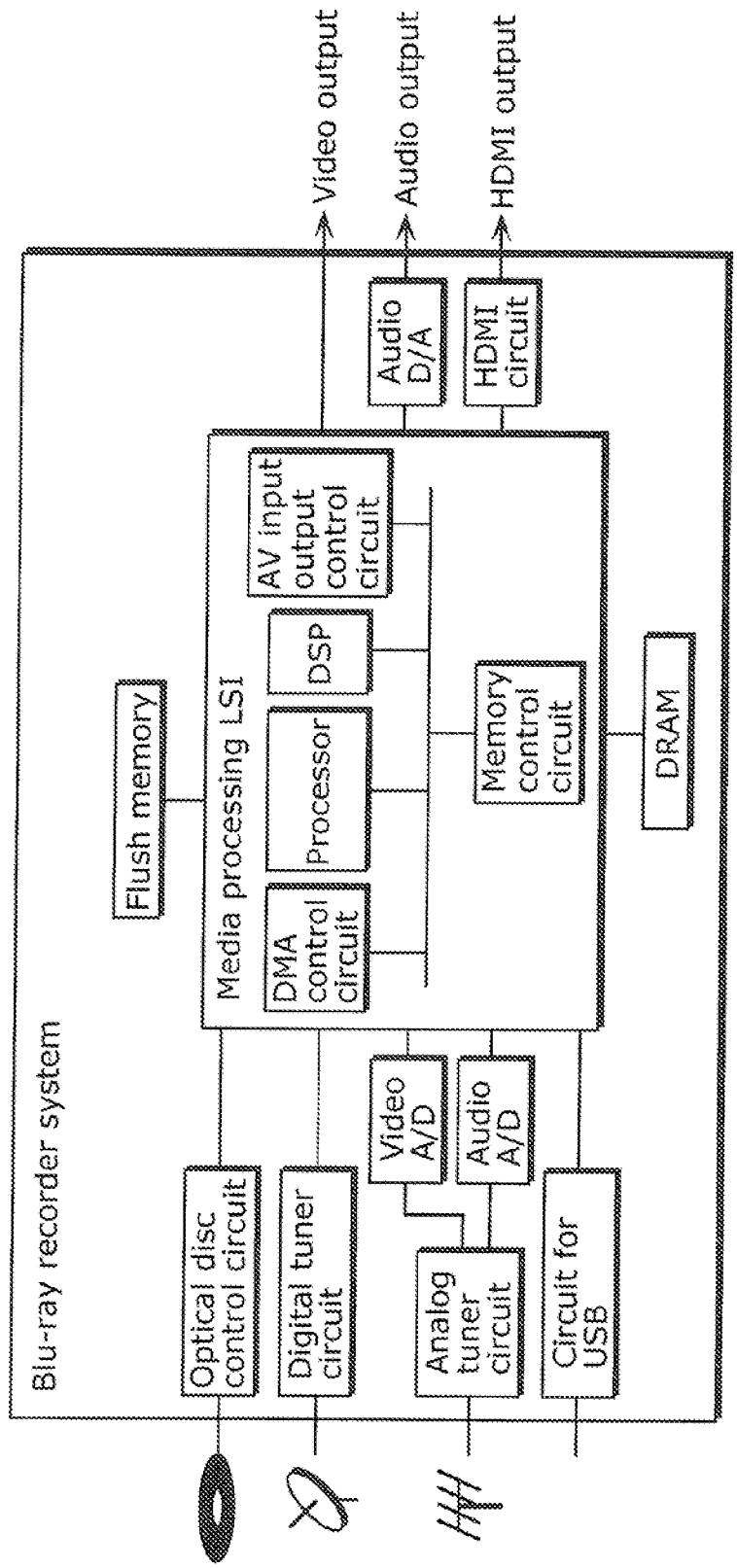
FIG. 17 is a diagram showing a configuration example of a system to which the present invention is applied.

FIG. 17 shows a configuration of a Blu-ray recorder system as an example of a system to which the present invention is applied. FIG. 17 is an example where the present invention is applied to a memory control circuit in a media processing LSI. The memory control circuit shown in FIG. 17 corresponds to the memory controller shown in FIG. 5A or 13. The memory control circuit in the media processing LSI is shown as one implementation example; however, the present invention may be applied to an arbitration circuit in a DMA control circuit or an arbitration circuit in an optical disc control circuit or the like.

Figure 18:
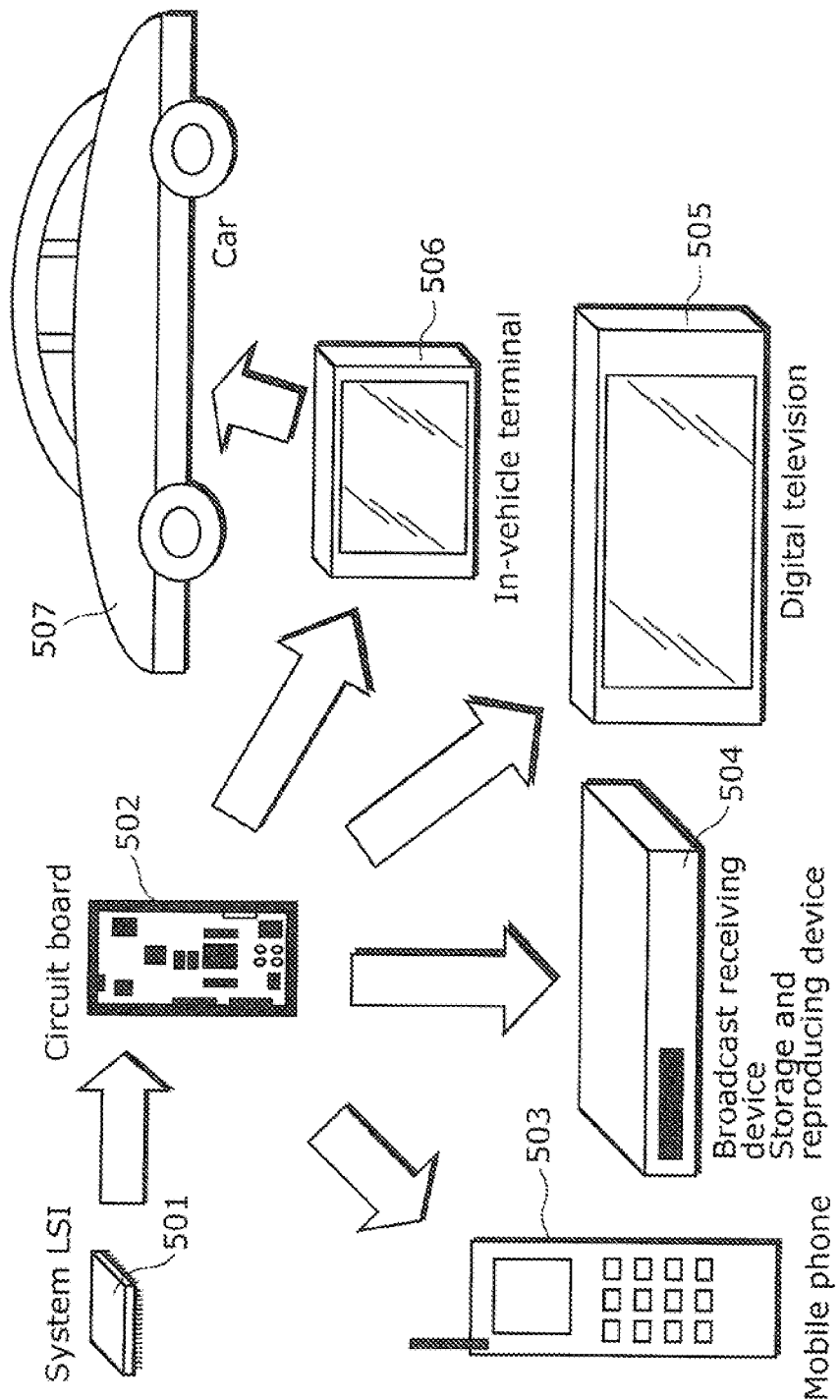
FIG. 18 is a diagram showing an application example of a system LSI and a set of system including the present invention.

FIG. 18 shows an application example of a system LSI and a set of system that include the present invention. The system LSI in FIG. 18 corresponds to the media processing LSI in FIG. 17. As described, the present invention can be applied not only to the system LSI, but also to various products such as a mobile phone, a broadcast receiving device, a storage and reproduction device, a digital television, an in-vehicle terminal, or a car.

INDUSTRIAL APPLICABILITY

The memory control method according to the present invention is useful for a memory control circuit in a system for an image processing control. Furthermore, the memory control method can also be used in a digital AV home electronics system such as a television, a video, a recorder, a camera, and a mobile phone, and in an image processing system in a personal computer and the like.

REFERENCE SIGNS LIST

101 Memory controller
102 Command generation unit
103 Device determination unit
104 Group determination unit
105 Command issuance unit
106 Data control unit
107 Master
108 Address conversion unit
201 DRAM
202 Prefetch buffer
203 P-S conversion unit

The invention claimed is:

1. A memory controller which controls access to a memory which stores image data and which is accessed in burst mode at a burst length of N that is an integer number of two of more,
the memory including:
a first group including a plurality of banks;
a second group including a plurality of banks;
a prefetch buffer of N bits, the prefetch buffer prefetching N-bit parallel data output from at least one of the first group and the second group; and
a parallel-serial conversion unit configured to perform parallel-to-serial conversion on the N-bit parallel data prefetched by the prefetch buffer, and to generate serial data of the burst length of N by making a frequency N times higher than an internal operating frequency of the memory, and
the prefetch buffer including a first operating mode where the N-bit parallel data is prefetched from one of the plurality of banks and a second operating mode where N/2-bit parallel data is prefeteched from each of two banks belonging to different groups,
said memory controller comprising:
a command generation unit configured to generate a plurality of access commands each including a physical address, based on an access request including a logical address indicating a rectangular area in the image data; and
a command issuance unit configured to issue, to the memory, the plurality of access commands generated by said command generation unit,
wherein said command generation unit includes
a group determination unit configured to determine a group to which a bank including data to be accessed belongs, based on the physical address corresponding to the access request,
wherein said command generation unit is configured to generate the plurality of access commands including a first access command and a second access command, in the case where the data to be accessed is continuous across two banks belonging to different groups,
wherein the first access command is a command for accessing to a bank belonging to the first group, using a half of the prefetch buffer, wherein the second access command is a command for accessing to a bank belonging to the second group, using a remaining half of the prefetch buffer, the second access command sharing the prefetch buffer with the first access command, wherein said command generation unit is configured to generate a third access command, in the case where the data to be accessed belongs to one of the first group and the second group, and wherein the third access command is a command for accessing to a bank belonging to one of the first group and the second group, using all of the prefetch buffer.

2. The memory controller according to claim 1,
wherein said memory controller is connected to a plurality of memories including the memory, wherein said command generation unit further includes
a memory determination unit configured to determine, from among the plurality of memories, a memory to which the data to be accessed belongs, based on the physical address corresponding to the access request, and wherein said command generation unit is configured to generate the plurality of access commands including the first access command and the second access command based on the determinations made by said group determination unit and said memory determination unit, in the case where the data to be accessed belongs to a single memory and is continuous across two banks belonging to different groups.

3. The memory controller according to claim 1,
wherein the image data includes data blocks each of which belongs to a group different from a group to which an adjacent data block belongs, the data blocks each being S pixels (where S is an integer number of two or more) that are continuous in a row direction of the pixel data.

4. The memory controller according to claim 3,
wherein the data block is half a size of data that is accessed in the burst mode at the burst length of N.

5. The memory controller according to claim 3,
wherein the data block is a minimum access unit.

6. The memory controller according to claim 3,
wherein, M data blocks (where M is an integer number of 2 or more) that are adjacent in a column direction belong to a same group which is different from a group to which other M data blocks adjacent to the M data blocks in the column direction belong.

7. The memory controller according to claim 6,
wherein a row that is accessed based on the second access command is an M-th line in the column direction from a row that is accessed based on the first access command.

8. The memory controller according to claim 6,
wherein M is 2.

9. A memory system comprising a memory and a memory controller, said memory storing image data and being accessed in burst mode at a burst length of N where N is an integer number of two or more,
wherein said memory includes:
a first group including a plurality of banks;
a second group including a plurality of banks;
a prefetch buffer of N bits, the prefetch buffer prefetching N-bit parallel data output from at least one of the first group and the second group; and
a parallel-serial conversion unit configured to perform parallel-to-serial conversion on the N-bit parallel data prefetched by the prefetch buffer, and to generate serial data of the burst length of N by making a frequency N times higher than an internal operating frequency of said memory, wherein said prefetch buffer includes a first operating mode where the N-bit parallel data is prefetched from one of said plurality of banks and a second operating mode where N/2-bit parallel data is prefetched from each of two banks belonging to different groups, wherein said memory controller includes:
a command generation unit configured to generate a plurality of access commands each including a physical address, based on an access request including a logical address indicating a rectangular area in the image data; and
a command issuance unit configured to issue, to said memory, the plurality of access commands generated by said command generation unit, wherein said command generation unit includes a group determination unit configured to determine whether or not data to be accessed is continuous across two banks belonging to different groups, wherein said command generation unit is configured to generate the plurality of access commands including a first access command and a second access command based on the determination made by said group determination unit, wherein the first access command is a command for accessing to a bank belonging to the first group, using a half of said prefetch buffer, wherein the second access command is a command for accessing to a bank belonging to the second group, using a remaining half of said prefetch buffer, the second access command sharing said prefetch buffer with the first access command, wherein said command generation unit is configured to generate a third access command, in the case where the data to be accessed belongs to one of the first group and the second group, and wherein the third access command is a command for accessing to a bank belonging to one of the first group and the second group, using all of the prefetch buffer.

10. A semiconductor integrated circuit which includes the memory controller according to claim 1.

11. A memory control method for controlling access to a memory which stores image data and which is accessed in burst mode at a burst length of N that is an integer number of two or more,
the memory including:
a first group including a plurality of banks;
a second group including a plurality of banks;
a prefetch buffer of N bits, the prefetch buffer prefetching N-bit parallel data output from at least one of the first group and the second group; and
a parallel-serial conversion unit configured to perform parallel-to-serial conversion on the N-bit parallel data prefetched by the prefetch buffer, and to generate serial data of the burst length of N by making a frequency N times higher than an internal operating frequency of the memory, and the prefetch buffer including a first operating mode where the N-bit parallel data is prefetched from one of the plurality of banks and a second operating mode where N/2-bit parallel data is prefetched from each of two banks belonging to different groups, said memory control method comprising:

generating a plurality of access commands each including a physical address, based on an access request including a logical address indicating a rectangular area in the image data; and issuing, to the memory, the plurality of access commands generated in said generating, wherein said generating includes determining whether or not data to be accessed is continuous across two banks belonging to different groups, based on the physical address corresponding to the access request, and generating a first access command and a second access command based on the determination, wherein the first access command is a command for accessing to a bank belonging to the first group, using a half of the prefetch buffer, wherein the second access command is a command for accessing to a bank belonging to the second group, using a remaining half of the prefetch buffer, the second access command sharing the prefetch buffer with the first access command, wherein said generating includes generating a third access command, in the case where the data to be accessed belongs to one of the first group and the second group, and wherein the third access command is a command for accessing to a bank belonging to one of the first group and the second group, using all of the prefetch buffer.

* * * * *